United States Patent
Hwang et al.

(10) Patent No.: US 10,313,062 B2
(45) Date of Patent: Jun. 4, 2019

(54) METHOD AND USER EQUIPMENT FOR TRANSMITTING HARQ ACK/NACK FOR DOWNLINK DATA WHEN USING MORE THAN FIVE CELLS ACCORDING TO CARRIER AGGREGATION

(71) Applicant: LG ELECTRONICS INC., Seoul (KR)

(72) Inventors: Daesung Hwang, Seoul (KR); Suckchel Yang, Seoul (KR); Seungmin Lee, Seoul (KR); Hanjun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/534,455

(22) PCT Filed: Dec. 4, 2015

(86) PCT No.: PCT/KR2015/013190
§ 371 (c)(1),
(2) Date: Jun. 8, 2017

(87) PCT Pub. No.: WO2016/093556
PCT Pub. Date: Jun. 16, 2016

(65) Prior Publication Data
US 2017/0366305 A1    Dec. 21, 2017

Related U.S. Application Data

(60) Provisional application No. 62/089,236, filed on Dec. 9, 2014, provisional application No. 62/100,874, filed
(Continued)

(51) Int. Cl.
*H04L 1/18* (2006.01)
*H04L 5/00* (2006.01)
*H04W 72/04* (2009.01)

(52) U.S. Cl.
CPC .......... *H04L 1/1812* (2013.01); *H04L 1/1861* (2013.01); *H04L 5/001* (2013.01);
(Continued)

(58) Field of Classification Search
CPC ..................................................... H04L 1/1809
(Continued)

(56) References Cited

U.S. PATENT DOCUMENTS

| 7,916,775 | B2 * | 3/2011 | Kim ...................... H04L 1/1621 370/278 |
| 2015/0113360 | A1 * | 4/2015 | Lee ......................... G06F 11/10 714/776 |

(Continued)

FOREIGN PATENT DOCUMENTS

| JP | 2013531941 | 8/2013 |
| KR | 1020120055609 | 5/2012 |

(Continued)

OTHER PUBLICATIONS

PCT International Application No. PCT/KR2015/013190, International Search Report dated Mar. 10, 2016, 3 pages.

*Primary Examiner* — Fritz Alphonse
(74) *Attorney, Agent, or Firm* — Lee, Hong, Degerman, Kang & Waimey

(57) ABSTRACT

Provided in one disclosure of the present specification is a method for transmitting a hybrid automatic repeat request (HARQ) acknowledgement (ACK)/negative-acknowledgement (NACK) for downlink data, when more than five cells are used according to carrier aggregation (CA) by a user equipment (UE). The method comprises the steps of: receiving, from a base station, a list of sets of which HARQ-ACK/NACK transmission is limited, through an upper layer signal; receiving, from the base station, information indicating a set of which HARQ-ACK/NACK transmission is
(Continued)

limited at the present turn, from among the list of sets; receiving, from the base station, a plurality of items of downlink data through a plurality of cells; determining the set of which transmission is limited based on the information, from among the list of sets that has been received through the upper layer signal; and generating and transmitting uplink control information (UCI) including HARQ-ACK/NACK for the downlink data but excluding the HARQ-ACK/NACK according to the set which has been determined.

13 Claims, 13 Drawing Sheets

Related U.S. Application Data on Jan. 7, 2015, provisional application No. 62/161,858, filed on May 14, 2015, provisional application No. 62/203,917, filed on Aug. 12, 2015, provisional application No. 62/216,350, filed on Sep. 9, 2015, provisional application No. 62/219,107, filed on Sep. 15, 2015.

(52) U.S. Cl.
CPC .......... *H04L 5/0055* (2013.01); *H04L 1/1896* (2013.01); *H04W 72/042* (2013.01); *H04W 72/0413* (2013.01)

(58) Field of Classification Search
USPC ........................................ 714/748, 750, 746
See application file for complete search history.

(56) References Cited

U.S. PATENT DOCUMENTS

| 2015/0358113 | A1* | 12/2015 | Callard | ................. H04W 28/04 714/776 |
| 2016/0026523 | A1* | 1/2016 | Cohen | ................... H04L 1/0046 714/807 |

FOREIGN PATENT DOCUMENTS

| KR | 1020120093912 | 8/2012 |
| KR | 1020130072240 | 7/2013 |
| KR | 1020130143073 | 12/2013 |
| WO | 2011157234 | 12/2011 |

* cited by examiner

METHOD AND USER EQUIPMENT FOR TRANSMITTING HARQ ACK/NACK FOR DOWNLINK DATA WHEN USING MORE THAN FIVE CELLS ACCORDING TO CARRIER AGGREGATION

CROSS-REFERENCE TO RELATED APPLICATIONS

This application is the National Stage filing under 35 U.S.C. 371 of International Application No. PCT/KR2015/013190, filed on Dec. 4, 2015, which claims the benefit of U.S. Provisional Applications No. 62/089,236, filed on Dec. 9, 2014, 62/100,874, filed on Jan. 7, 2015, 62/161,858, filed on May 14, 2015, 62/203,917, filed on Aug. 12, 2015, 62/216,350, filed on Sep. 9, 2015 and 62/219,107, filed on Sep. 15, 2015, the contents of which are all hereby incorporated by reference herein in their entirety.

BACKGROUND OF THE INVENTION

Field of the Invention

The present invention relates to mobile communication.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, in order to handle an increasing amount of data, LTE-Advanced has proposed carrier aggregation (CA) of aggregating up to five carriers.

However, since the amount of data continues to rapidly increase, aggregation of more than 5 carriers is under discussion in a next-generation mobile communication system.

Here, in cases where more than five carriers are aggregated, more bits are required to be transmitted in a PUCCH. Currently, however, only hybrid automatic repeat request (HARQ) acknowledgement (ACK)/non-acknowledgement (NACK) of up to 20 bits may be transmitted in the PUCCH.

SUMMARY OF THE INVENTION

Accordingly, the disclosure of the specification has been made in an effort to solve the problem.

In an aspect, there is provided a method for transmitting a hybrid automatic repeat request (HARQ) acknowledgement (ACK)/negative-acknowledgement (NACK) for downlink data. The method may be performed by a user equipment (UE) which uses more than five cells according to carrier aggregation (CA). The method may comprise: receiving, from a base station (BS), a list of sets limited in HARQ-ACK/NACK transmission, through higher layer signaling; receiving, from the BS, information indicating a set limited in HARQ-ACK/NACK transmission at the present turn, from among the list of sets; receiving, from the BS, a plurality of items of downlink data through a plurality of cells; determining the set limited in transmission on the basis of the information, from among the list of sets that received through the higher layer signaling; and generating and transmitting uplink control information (UCI) including HARQ-ACK/NACK for the downlink data, excluding the HARQ-ACK/NACK in accordance with the determined set.

The information may be received through downlink control information (DCI).

The DCI may be received from each of a plurality of cells of a BS.

The information within the plurality of DCIs may indicate the set limited in HARQ-ACK/NACK transmission at the present turn equally or differently.

The list may be indicated in sets of cells limited in HARQ-ACK/NACK transmission.

When receiving of the information fails, a set limited in transmission may be determined according to preset default setting in the determining of a set limited in transmission.

The method may further include: transmitting an indicator indicating use of the preset default setting to the BS.

In another aspect, there is provided a user equipment (UE) for transmitting a hybrid automatic repeat request (HARQ) acknowledgement (ACK)/negative-acknowledgement (NACK) for downlink data, when more than five cells are used according to carrier aggregation (CA). The UE may include a transceiver unit; and a processor controlling an RF unit. The processor may perform: receiving, from a base station (BS), a list of sets limited in HARQ-ACK/NACK transmission, through higher layer signaling; receiving, from the BS, information indicating a set limited in HARQ-ACK/NACK transmission at the present turn, from among the list of sets; receiving, from the BS, a plurality of items of downlink data through a plurality of cells; determining the set limited in transmission on the basis of the information, from among the list of sets that received through the higher layer signaling; and generating and transmitting uplink control information (UCI) including HARQ-ACK/NACK for the downlink data, excluding the HARQ-ACK/NACK in accordance with the determined set.

According to the disclosure of the present specification, the problems of the above-described prior art are solved.

DESCRIPTION OF EXEMPLARY EMBODIMENTS

Figure 1:
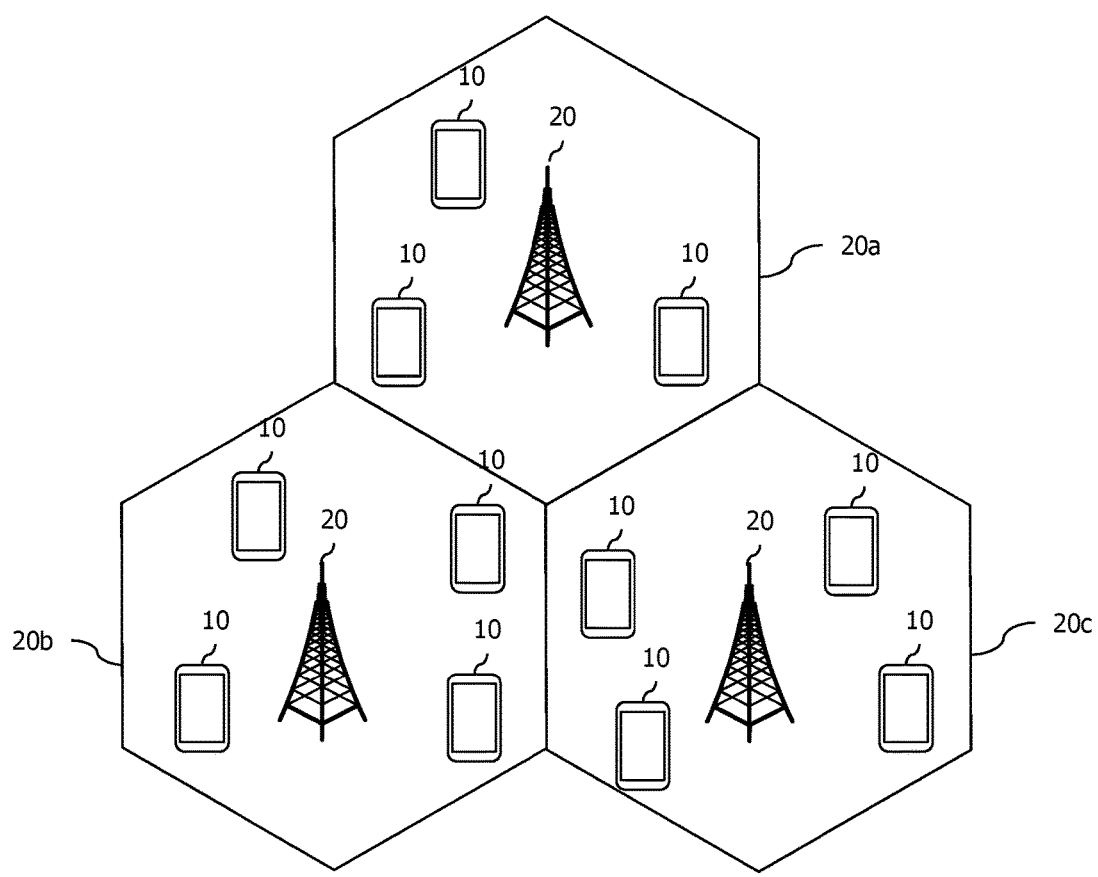
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc.

FIG. 1 Illustrates a Wireless Communication System.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a sub-frame, the uplink transmission and the downlink transmission are performed in different sub-frames.

Hereinafter, the LTE system will be described in detail.

Figure 2:
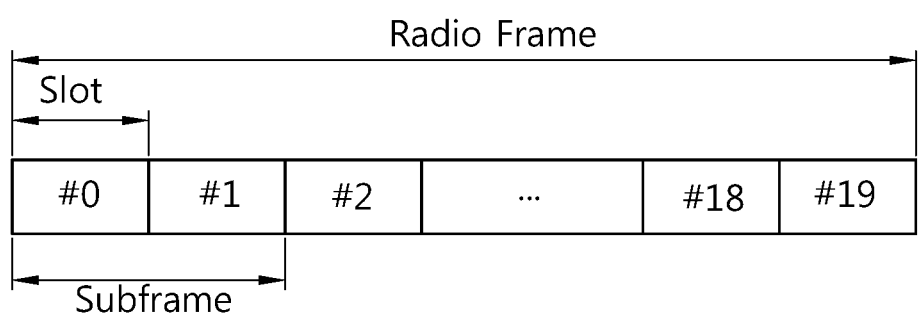
FIG. 2 illustrates the architecture of a radio frame according to frequency division duplex (FDD) of 3rd generation partnership project (3GPP) long term evolution (LTE).

FIG. 2 Shows a Downlink Radio Frame Structure According to FDD of 3rd Generation Partnership Project (3GPP) Long Term Evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of orthogonal frequency division multiplexing (OFDM) symbols. The number of OFDM symbols included in one slot may vary depending on a cyclic prefix (CP). One slot includes 7 OFDM symbols in case of a normal CP, and one slot includes 6 OFDM symbols in case of an extended CP. Herein, since the 3GPP LTE uses orthogonal frequency division multiple access (OFDMA) in a downlink (DL), the OFDM symbol is only for expressing one symbol period in a time domain, and there is no limitation in a multiple access scheme or terminologies. For example, the OFDM symbol may also be referred to as another terminology such as a single carrier frequency division multiple access (SC-FDMA) symbol, a symbol period, etc.

Figure 3:
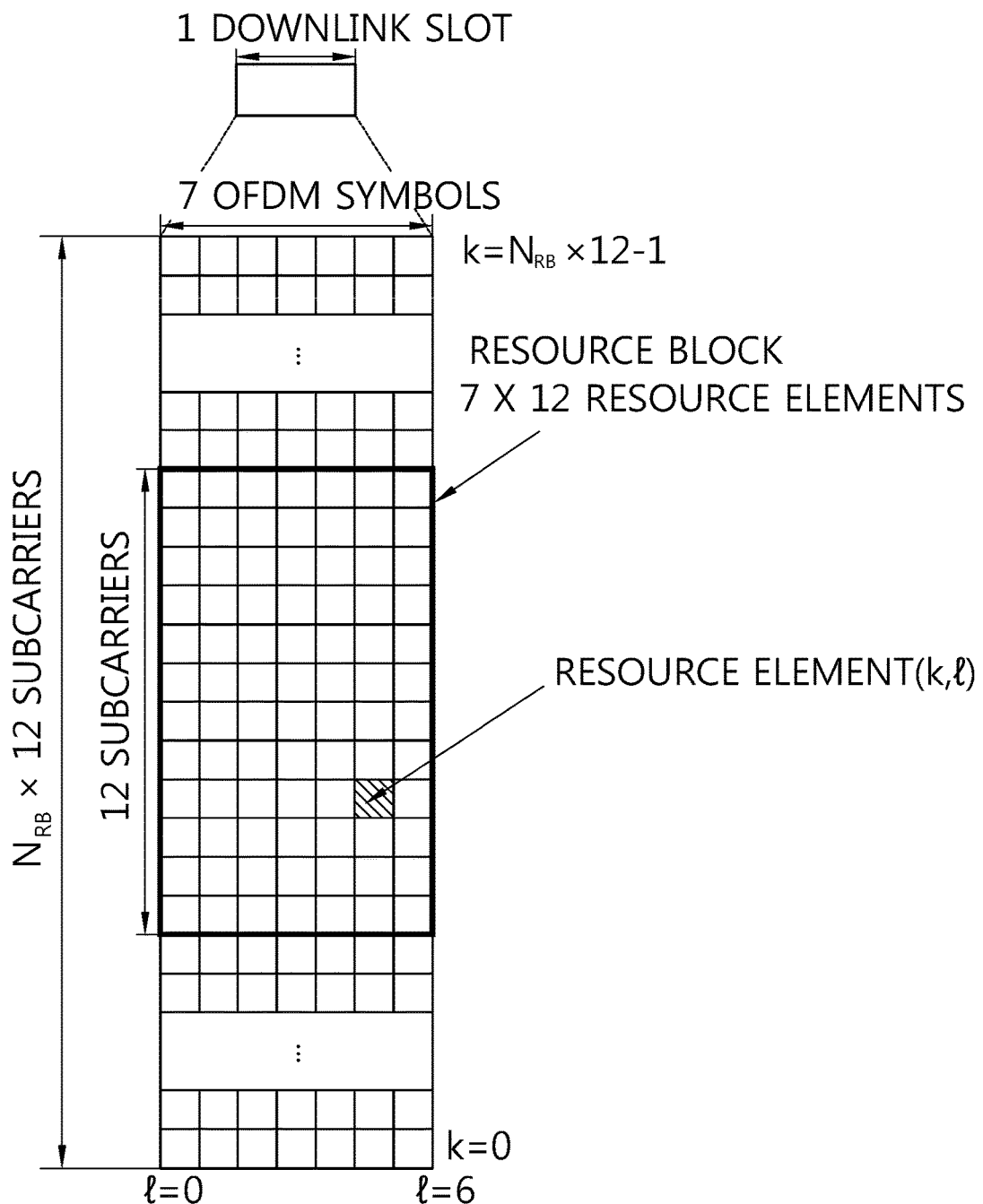
FIG. 3 illustrates the architecture of a downlink radio frame according to time division duplex (TDD) in 3GPP LTE.

FIG. 3 Illustrates an Example Resource Grid for One Uplink or Downlink Slot in 3GPP LTE.

Referring to FIG. 3, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., $N_{RB}$, may be one from 6 to 110.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 3 may also apply to the resource grid for the downlink slot.

Figure 4:
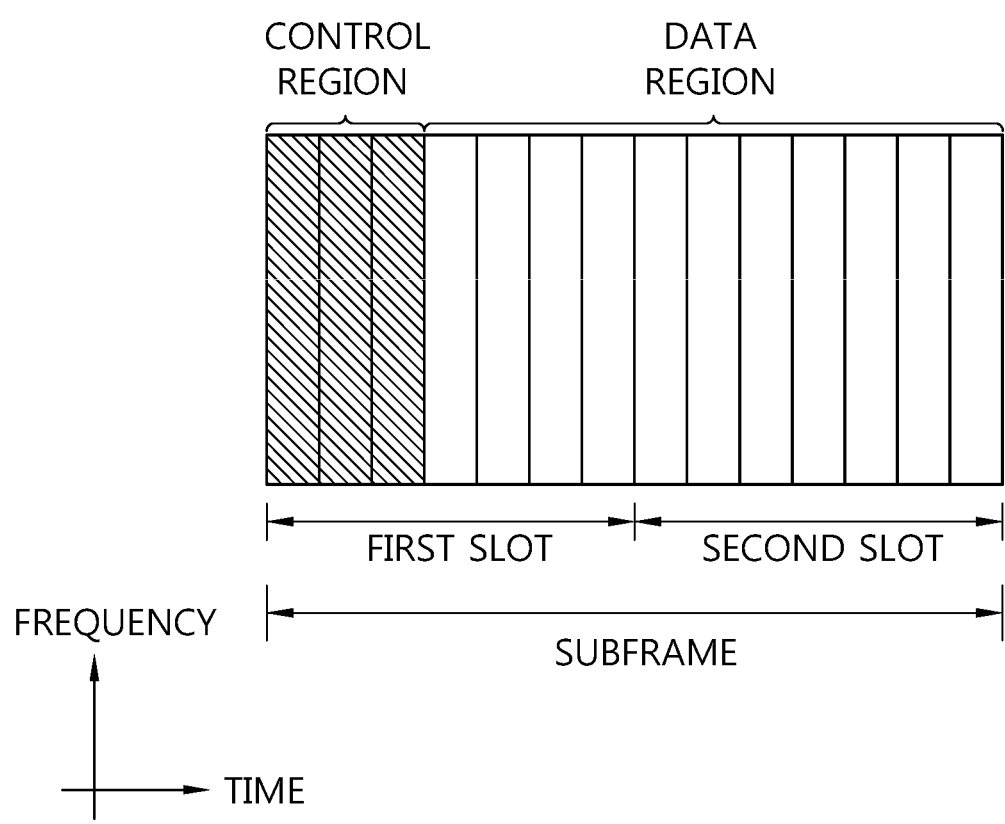
FIG. 4 illustrates an example resource grid for one uplink or downlink slot in 3GPP LTE.

FIG. 4 Illustrates the Architecture of a Downlink Sub-Frame.

In FIG. 4, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are allocated to the control region, and a PDSCH is allocated to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Figure 5:
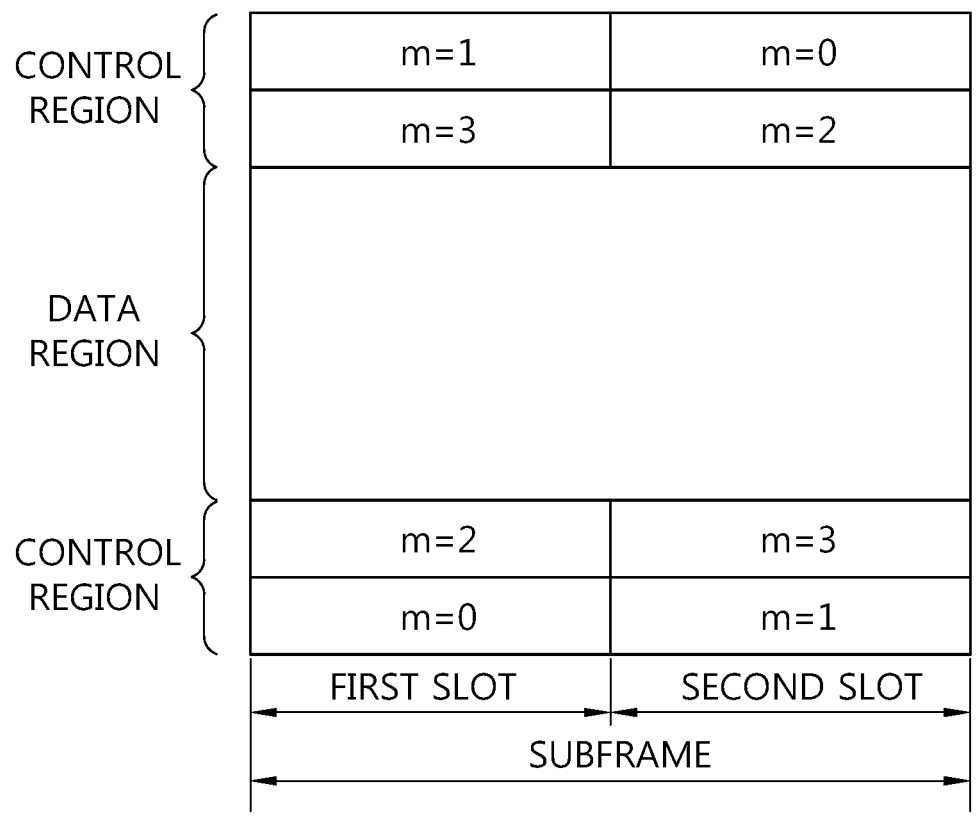
FIG. 5 illustrates the architecture of a downlink subframe.
Figure 5:
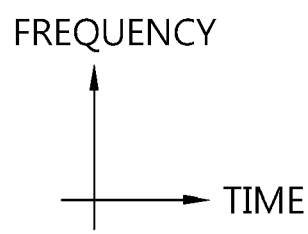

FIG. 5 Illustrates the Architecture of an Uplink Sub-Frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

Figure 6:
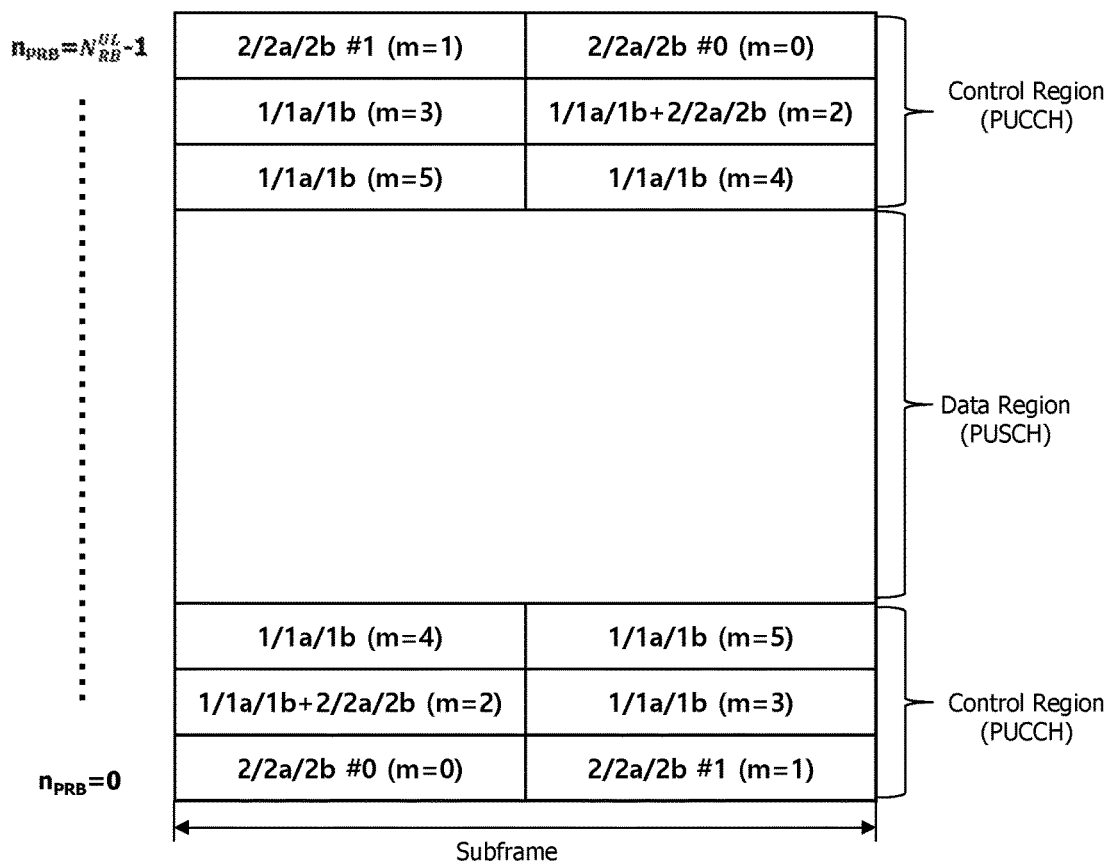
FIG. 6 is an exemplary diagram illustrating a transmission region based on the PUCCH formation.

FIG. 6 Illustrates the PUCCH and the PUSCH on an Uplink Subframe.

PUCCH formats will be described with reference to FIG. 6.

The PUCCH format 1 carries the scheduling request (SR). In this case, an on-off keying (OOK) mode may be applied. The PUCCH format 1a carries acknowledgement/non-acknowledgement (ACK/NACK) modulated in a binary phase shift keying (BPSK) mode with respect to one codeword. The PUCCH format 1b carries ACK/NACK modulated in a quadrature phase shift keying (QPSK) mode with respect to two codewords. The PUCCH format 2 carries a channel quality indicator (CQI) modulated in the QPSK mode. The PUCCH formats 2a and 2b carry the CQI and the ACK/NACK.

A table given below carries the PUCCH formats.

TABLE 1

| Format | Modulation mode | Total bit count per subframe | Description |
|---|---|---|---|
| Format 1 | Undecided | Undecided | Scheduling request (SR) |
| Format 1a | BPSK | 1 | ACK/NACK of 1-bit HARQ, scheduling request (SR) may be present or not present |
| Format 1b | QPSK | 2 | ACK/NACK of 2-bit HARQ, scheduling request (SR) may be present or not present |
| Format 2 | QPSK | 20 | In case of extended CP, CSI and 1-bit or 2-bit HARQ ACK/NACK |
| Format 2a | QPSK + BPSK | 21 | CSI and 1-bit HARQ ACK/NACK |
| Format 2b | QPSK + BPSK | 22 | CSI and 2-bit HARQ ACK/NACK |
| Format 3 | QPSK | 48 | Multiple ACKs/NACKs, CSI, and scheduling request (SR) may be present or not present |

Each PUCCH format is transmitted while being mapped to a PUCCH region. For example, the PUCCH format 2/2a/2b is transmitted while being mapped to resource blocks (m=0 and 1) of band edges assigned to the UE. A mixed PUCCH RB may be transmitted while being mapped to a resource block (e.g., m=2) adjacent to the resource block to which the PUCCH format 2/2a/2b is assigned in a central direction of the band. The PUCCH format 1/1a/1b in which the SR and the ACK/NACK are transmitted may be disposed in a resource block in which m=4 or m=5. The number (N(2)RB) of resource blocks which may be used in the PUCCH format 2/2a/2b in which the CQI is transmitted may be indicated to the UE through a broadcasted signal.

Figure 7A:
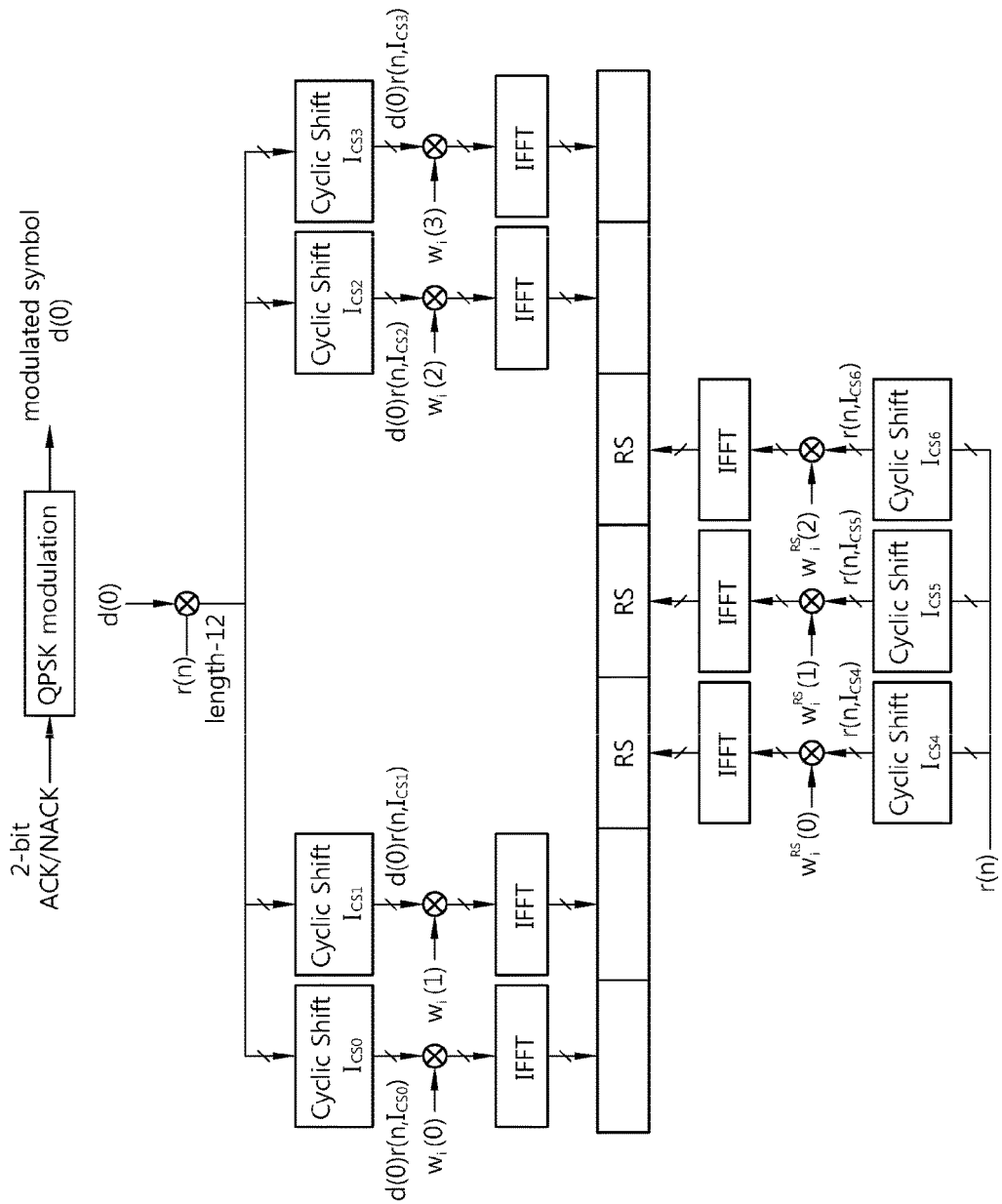
FIG. 7a illustrates a channel structure of PUCCH format 1b in a normal CP.

FIG. 7a Illustrates a Channel Structure of PUCCH Format 1b in a Normal CP.

One slot includes 7 OFDM symbols, 3 OFDM symbols become OFDM symbol for a reference signal for demodulation, that is, a demodulation reference signal (DMRS), and 4 OFDM symbols become a data OFDM symbol for an ACK/NACK signal.

In the PUCCH format 1b, an encoded 2-bit ACK/NACK signal is quadrature phase shift keying (QPSK)-modulated to generate modulation symbol d(0).

A cyclic shift index $I_{cs}$ may vary depending on a slot number $n_s$ and/or a slot symbol index 1 in the radio frame.

In a normal CP, since 4 data OFDM symbols exist in one slot in order to transmit the ACK/NACK signal, cyclic shift indexes corresponding to respective data OFDM symbols are set as $I_{cs0}$, $I_{cs1}$, $I_{cs2}$, and $I_{cs3}$.

The modulation symbol d(0) is spread to a cyclic shifted sequence $r(n,I_{cs})$. When a 1D spread sequence corresponding to an (i+1)-th OFDM symbol in the slot is m(i), the 1D spread sequence may be expressed as {m(0), m(1), m(2), m(3)}={d(0)r(n,$I_{cs0}$), d(0)r(n,$I_{cs1}$), d(0)r(n,$I_{cs2}$), d(0)r(n,$I_{cs3}$)}.

In order to increase a UE capacity, the 1D spread sequence may be spread by using an orthogonal sequence. The following sequence is used as an orthogonal $w_i(k)$ (i represents a sequence index, 0≤k≤K−1) in which a spreading factor K is 4.

TABLE 2

| Index (i) | K = 4 | K = 3 |
|---|---|---|
| | [$w_i(0)$, $w_i(1)$, $w_i(2)$, $w_i(3)$] | [$w_i(0)$, $w_i(1)$, $w_i(2)$] |
| 0 | [+1, +1, +1, +1] | [+1, +1, +1] |
| 1 | [+1, −1, +1, −1] | [+1, $e^{j2\pi/3}$, $e^{j4\pi/3}$] |
| 2 | [+1, −1, −1, +1] | [+1, $e^{j4\pi/3}$, $e^{j2\pi/3}$] |

Different spreading factors may be used for each slot.

Therefore, when a predetermined orthogonal sequence index i is given, 2D spread sequences {s(0), s(1), s(2), s(3)} may be expressed as follows.

$$\{s(0),s(1),s(2),s(3)\}=\{w_i(0)m(0),w_i(1)m(1),w_i(2)m(2),w_i(3)m(3)\}$$

The 2D spread sequences {s(0), s(1), s(2), s(3)} are transmitted in corresponding OFDM symbols after inverse fast Fourier transform (IFFT) is performed. As a result, the ACK/NACK signal is transmitted onto the PUCCH.

The reference signal of the PUCCH format 1b is transmitted by cyclic-shifting a base sequence r(n) and thereafter, spreading the cyclic-shifted sequence r(n) to the orthogonal sequence. When cyclic shift indexes corresponding to 3 RS OFDM symbols are $I_{cs4}$, $I_{cs5}$, and $I_{cs6}$, 3 cyclic-shifted sequences r(n,$I_{cs4}$), r(n,$I_{cs5}$), and r(n,$I_{cs6}$) may be acquired. 3 cyclic-shifted sequences are spread to an orthogonal sequence $w^{RS}_i(k)$ in which K=3.

An orthogonal sequence index i, a cyclic shift index $I_{cs}$, and a resource block index m are parameters required for configuring the PUCCH and resources used to distinguish the PUCCH (alternatively, UE). When the number of available cyclic shifts is 12 and the number of available orthogonal sequence indexes is 3, the PUCCHs for a total of 36 UEs may be multiplexed to one resource block.

In the 3GPP LTE, a resource index $n^{(1)}_{PUCCH}$ is defined in order for the UE to acquire 3 parameters for configuring the PUCCH. The resource index is defined as $n^{(1)}_{PUCCH}=n_{CCE}+N^{(1)}_{PUCCH}$, and $n_{CCE}$ represents a number of a first CCE used for transmitting a corresponding PDCCH (that is, a PDCCH including downlink resource allocation (DCI) to schedule downlink data corresponding to the ACK/NACK signal) and $N^{(1)}_{PUCCH}$ represents a parameter which the base station announces to the UE as a higher layer message.

Time, frequency, and code resources used for transmitting the ACK/NACK signal are referred to as an ACK/NACK resource or a PUCCH resource. As described above, an index (an ACK/NACK resource index or a PUCCH index) of the ACK/NACK resource required to transmit the ACK/NACK signal onto the PUCCH may be expressed as at least any one of the orthogonal sequence index i, the cyclic shift index $I_{cs}$, the resource block index m, and an index for acquiring the three indexes. The ACK/NACK resource may include at least any one of the orthogonal sequence, the cyclic shift, the resource block, and a combination thereof.

Figure 7B:
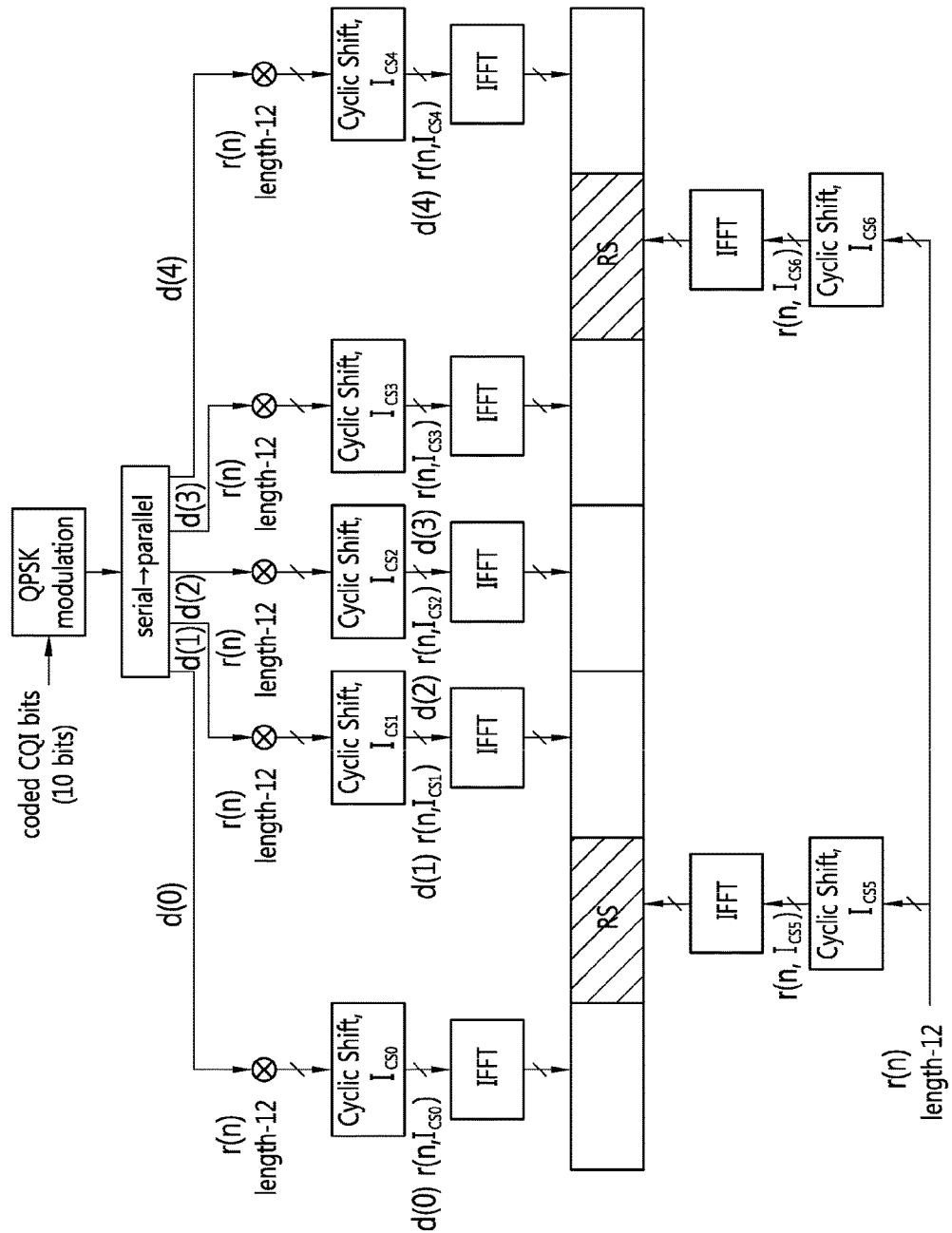
FIG. 7b illustrates a channel structure of PUCCH format 2/2a/2b in the normal CP.

FIG. 7b Illustrates a Channel Structure of PUCCH Format 2/2a/2b in the Normal CP.

Referring to FIG. 7b, OFDM symbols 1 and 5 (that is, second and sixth OFDM symbols) are used for the reference signal (DMRS) for demodulation and residual OFDM symbols are used for CQI transmission in the normal CP. In an extended CP, OFDM symbol 3 (a fourth symbol) is used for the DMRS.

10 CQI bits are channel-coded at, for example, 1/2 code rate to become 20 coded bits. A Reed-Muller code may be used in the channel coding. In addition, the Reed-Muller code is scrambled and thereafter, constellation-mapped, and as a result, a QPSK modulation symbol is generated (d(0) to d(4) in slot 0). Each QPSK modulation symbol is modulated by cyclic shift of the basic RS sequence r(n) having a length of 12 and subjected to the IFFT to be transmitted in 10 respective SC-FDMA symbols in the subframe. 12 cyclic shifts which are spaced apart from each other allow 12 different UEs to be orthogonally multiplexed in the same PUCCH resource block. The basic RS sequence r(n) may be used as RS sequences applied to OFDM symbols 1 and 5.

Figure 7C:
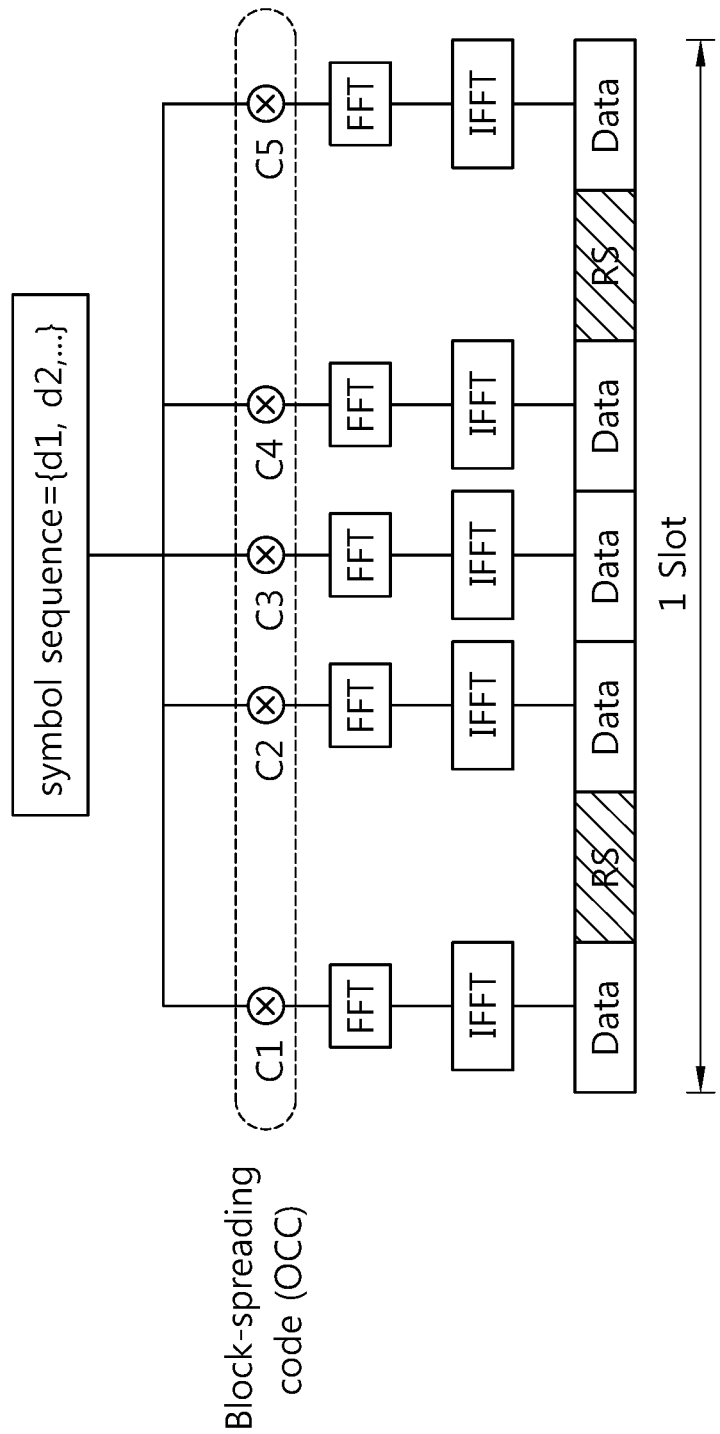
FIG. 7c illustrates the channel structure of PUCCH format 3.

FIG. 7c illustrates the channel structure of PUCCH format 3.

Referring to FIG. 7c, PUCCH format 3 is a PUCCH format using a block spreading technique. The block spreading technique means a method that spreads a symbol sequence in which multi-bit ACK/NACK is a time domain by using a block spreading code.

In the PUCCH format 3, the symbol sequence (e.g., an ACK/NACK symbol sequence) is spread and transmitted in the time domain by the block spreading code. An orthogonal cover code (OCC) may be used as the block spreading code. Control signals of multiple UEs may be multiplexed by the block spreading code. The PUCCH format 2 is different from the PUCCH format 3 in that in PUCCH format 2, symbols (e.g., d(0), d(1), d(2), d(3), d(4), etc., of FIG. 7b) transmitted in the respective data symbols are different from each other and UE multiplexing is performed by using the cyclic shift of a constant amplitude zero auto-correlation (CAZAC) sequence, while in the PUCCH format 3, the symbol sequence constituted by one or more symbols is transmitted throughout a frequency domain of each data symbol and spread in the time domain by the block spreading code to perform the UE multiplexing. In FIG. 7c, a case where 2 DMRS symbols are used in one slot is illustrated, but the present invention is not limited thereto and 3 DMRS symbols may be used and the orthogonal cover code having 4 as the spread factor may be used. The DMRS symbol may be generated from the CAZAC sequence having a specific cyclic shift and transmitted in a manner that a plurality of DMRS symbols of the time domain is multiplied by a specific orthogonal cover code.

<Carrier Aggregation>

Hereinafter, a carrier aggregation (CA) system will be described.

The carrier aggregation (CA) system means aggregating multiple component carriers (CCs). By the carrier aggregation, the existing meaning of the cell is changed. According to the carrier aggregation, the cell may mean a combination of a downlink component carrier and an uplink component carrier or a single downlink component carrier.

Further, in the carrier aggregation, the cell may be divided into a primary cell, secondary cell, and a serving cell. The primary cell means a cell that operates at a primary frequency and means a cell in which the UE performs an initial connection establishment procedure or a connection reestablishment procedure with the base station or a cell indicated by the primary cell during a handover procedure. The secondary cell means a cell that operates at a secondary frequency and once an RRC connection is established, the secondary cell is configured and is used to provide an additional radio resource.

As described above, the carrier aggregation system may support a plurality of component carriers (CC), that is, a plurality of serving cells unlike a single carrier system.

The carrier aggregation system may support cross-carrier scheduling. The cross-carrier scheduling is a scheduling method that may perform resource allocation of the PDSCH transmitted through another component carrier through the PDCCH transmitted through a specific component carrier and/or resource allocation of the PUSCH transmitted through other component carrier other than the component carrier fundamentally linked with the specific component carrier.

<Introduction of Small Cell>

In a next-generation mobile communication system, it is anticipated that a small cell having a small cell coverage radius is added to coverage of an existing cell and the small cell handles more traffic. Since the existing cell has large coverage, relative to the small cell, the existing cell may be termed a macro cell. This will be described with reference to FIG. 10 hereinafter.

Figure 8:
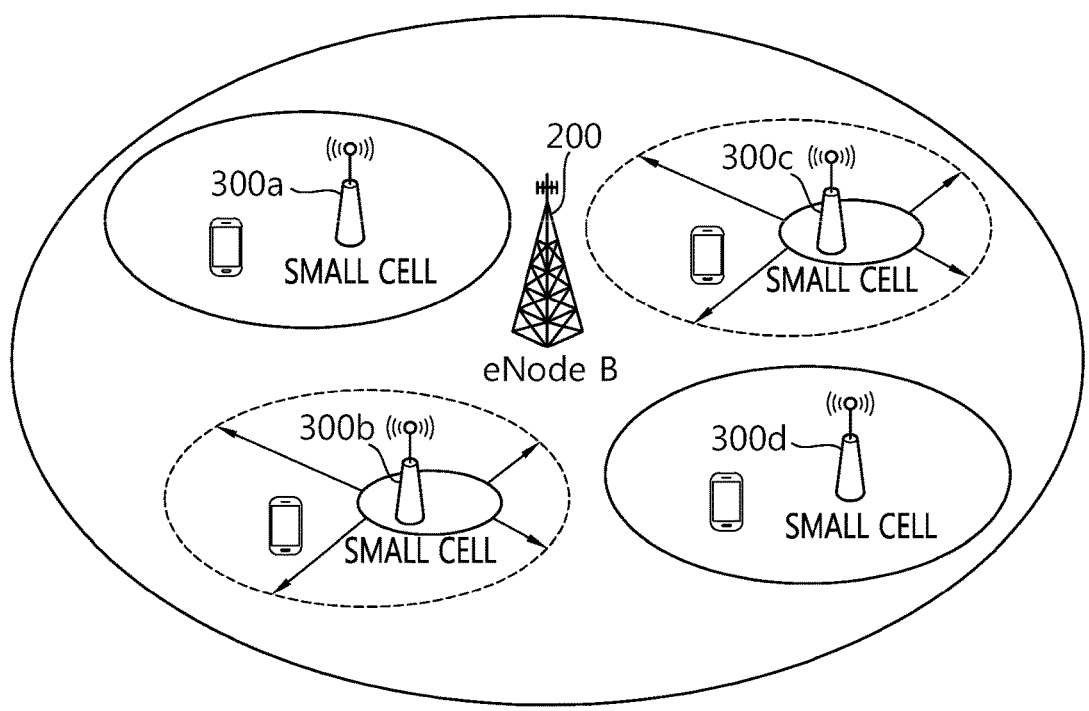
FIG. 8 is a view illustrating an environment of a heterogeneous network in which a macro cell and small cells coexist, having a possibility of being a next-generation wireless communication system.

FIG. 8 is a View Illustrating an Environment of a Heterogeneous Network in which a Macro Cell and Small Cells Coexist, Having a Possibility of being a Next-Generation Wireless Communication System.

Referring to FIG. 8, a heterogeneous network environment in which a macro cell based on an existing base station (BS) (or eNB) 200 overlaps small cells based on one or more small BSs 300a, 300b, 300c, and 300d is illustrated. Since the existing BS provides larger coverage, relative to the small BSs, the existing BS is called a macro eNodeB (MeNB). In this disclosure, the terms of the macro cell and the MeNB will be mixedly used. A UE connected to the macro c3ll 20 may be termed a macro UE. The macro UE receives a downlink signal from the MeNB and transmits an uplink signal to the MeNB.

In the heterogeneous network, the macro cell may be configured as a primary cell Pcell and the small cell may be configured as a secondary cell (S cell) to fill up a gap of the coverage of the macro cell. Also, the small cell may be configured as a primary cell (Pcell) and the macro cell may be configured as a secondary cell (Scell) to boost overall performance.

The small cell may use a frequency band currently allocated to LTE/LTE-A or may use a higher frequency band (e.g., band of 3.5 GHz or higher).

In the LTE-A system, it is also considered that the small cell is used as a macro-assisted small cell which cannot be independently used and may be used with the help of the macro cell.

The small cells 300a, 300b, 300c, and 300d may have a similar channel environment and, since these small cells 300a, 300b, 300c, and 300d are close to each other, interference therebetween may cause a serious problem.

In order to reduce such an interference influence, the small cells 300b and 300c may expand or reduce coverage thereof. Expansion and reduction of coverage is termed cell breathing. For example, as illustrated, the small cells 300b and 300c may be turned on or off depending on situations.

The small cell may use a frequency band allocated to the LTE/LTE-A or may use a higher frequency band (e.g., band of 3.5 GHz or higher).

<Enhanced Carrier Aggregation (eCA)>

Figure 9:
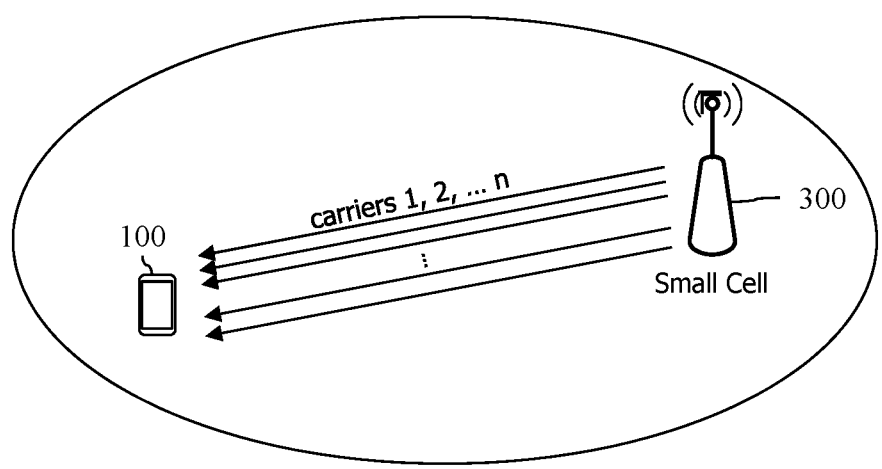
FIG. 9 is a conceptual view of eCA having a possibility of being a next-generation wireless communication system.

FIG. 9 is a conceptual view of eCA having a possibility of being a next-generation wireless communication system.

In a next-generation system, solving the problem that only up to five carriers can be aggregated in the related art, aggregating a maximum of Y number of carriers may be considered to process rapidly increasing downlink data. As the value Y, 8, 16, 32, and the like, may be considered. Also, classifying cells (e.g., configured cells or activated cells) based on carrier aggregation (CA) into a plurality of groups and managing the same may be considered.

Here, when 5 or more cells are used according to CA, HARQ ACK/NACK exceeds 20 bits. However, with an existing PUCCH format, there is no way to transmit the HARQ ACK/NACK exceeding 20 bits.

In a specific example, when 16 cells are used according to CA in an FDD system, bits of the HARQ ACK/NACK is 16 bits, but, in the case of not performing spatial bundling, the bits of HARQ ACK/NACK is a maximum of 32 bits. Thus, 16 cells may be used according to CA, but when spatial bundling is not performed, the 32-bit HARQ ACK/NACK cannot be transmitted with the existing PUCCH format. In another example, in a TDD system, on the basis of a case in which the number of downlink subframes corresponding to a single uplink subframe is 4, when 16 cells are used according to CA and spatial bundling is used, a HARQ ACK/NACK to be transmitted by a UE is 64 bits. However, in cases where the cells are classified into two groups and a PUCCH resource is independently allocated to each cell group (CG), an HARQ ACK/NACK for the UE to transmit to each CG (eight cells) may be 32 bits.

With the existing PUCCH format, a maximum of 20-bit HARQ ACK/NACK may be transmitted, and thus, the UE cannot transmit a 32-bit HARQ ACK/NACK. In addition, when spatial bundling is not performed, HARQ ACK/NACK is 128 bits or 64 bits, and thus, the UE cannot transmit the HARQ ACK/NACK with the existing PUCCH format.

Meanwhile, when transmitting with a PUCCH format 3 or a PUSCH in the related art, an HARQ ACK/NACK payload size is configured in relation to the number of cells configured by CA. However, even when only some of cells configured by CA schedule downlink and transmit downlink data, the UE determines a maximum number of HARQ-ACK/NACK bits on the basis of all the cells to transmit HARQ-ACK/NACK, unnecessarily wasting resource.

<Embodiment of Present Disclosure>

Thus, the present disclosure proposes a scheme of solving the problem.

In detail, an embodiment of the present disclosure proposes a scheme of reducing an HARQ-ACK/NACK payload size (i.e., a UCI size) as part of a scheme for a UE to transmit an HARQ-ACK/NACK of 20 bits or greater using an existing physical channel (e.g., a PUCCH format 3, PUSCH, etc.) when a maximum value of the HARQ-ACK/NACK (or UCI) is 20 or exceeds 20 bits.

The scheme described in this disclosure is not limited to UCI transmission through an existing physical channel and may be applied when a new PUCCH format is introduced. Also, the scheme of reducing an HARQ-ACK/NACK payload size described in this disclosure is not limited to a TDD system and may also be applied to an FDD system. Also, the scheme described in this disclosure may also be applied to a case in which an FDD-based cell and a TDD-based cell are simultaneously configured by CA. Separate operations of schemes described hereinafter may be considered or combined operations of the schemes may also be considered. Also, the technical concept of the present disclosure may also be extendedly applied to a UCI other than the HARQ-ACK and may effectively reduce a payload size of a CSI.

I. Scheme of Limiting Transmission of Partial UCI (HARQ-ACK)

In order to reduce an HARQ-ACK/NACK payload size, it may be considered not to transmit some HARQ-ACKs (at a specific transmission time point). From the point of view of a base station (BS), the BS may not always perform scheduling in every CC even in a situation in which a plurality of CCs (e.g., 16 CCs or 32 CCs) are configured. In detail, in cases where an HARQ-ACK/NACK payload size exceeds 20 or 21 bits, although the BS performs scheduling in most CCs, the BS may not transmit an HARQ-ACK regarding corresponding downlink data on the assumption that the UE may receive downlink data re-transmitted from the BS later.

The HARQ-ACK/NACK limited in transmission by the UE may be configured on the basis of a specific cell index. Here, cells corresponding to cell indices cannot always expect to receive an HARQ-ACK from the UE, and thus, overall throughput in downlink may be degraded. As a solution, the BS may consider to configure a candidate list limited by the UE in HARQ-ACK/NACK transmission, to UE through RRC signaling.

In cases where the BS configures a candidate list limited in HARQ-ACK/NACK transmission by the UE, to the UE through RRC signaling, flexibility may be degraded when the BS performs scheduling due to a limitation in the HARQ ACK/NACK transmission by the UE. In order to complement this, the BS may consider to inform the UE about a plurality of lists regarding sets limited in HARQ-ACK/NACK transmission of the UE through RRC signaling and subsequently inform the UE about a list actually limited in HARQ-ACK/NACK transmission by the UE among the lists through L1 signaling (e.g., DCI), or the like.

Figure 10:
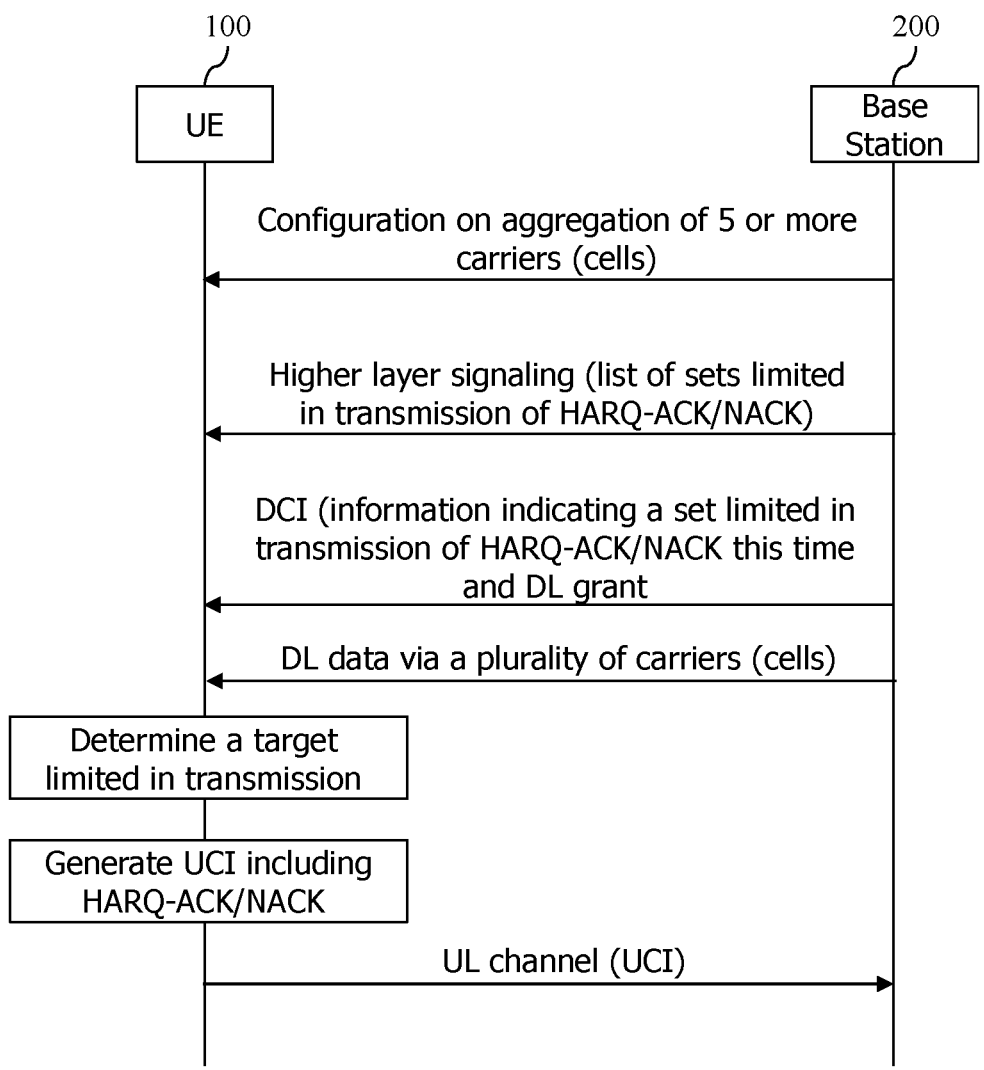
FIG. 10 is a flow chart illustrating a method according to the present disclosure.

FIG. 10 is a Flow Chart Illustrating a Method According to the Present Disclosure.

Referring to FIG. 10, a BS 200 transmits a configuration regarding aggregation of carriers (cells) exceeding 5 carriers to a UE 100.

Also, the BS transmits a list of sets limited in HARQ-ACK/NACK transmission to the UE 100 through higher layer signaling, e.g., RRC signaling.

Also, the BS delivers information indicating a set limited in HARQ-ACK/NACK transmission this time, included in the list of sets and a downlink control information (DCI) including a downlink grant to the UE.

Thereafter, the BS 200 transmits downlink data on a plurality of carriers (cells).

Then, the UE 100 determines a target limited in transmission on the basis of the information indicated by the DCI on the list of the sets received through the higher layer signaling.

The UE 100 generates a UCI including HARQ-ACK/NACK excluding a target limited in transmission, and transmits the generated UCI.

For example, in cases where the BS configures trigger00{CC#1}, trigger01{CC#3}, trigger10{CC#4, CC#6}, and trigger11{CC#10} to the UE through RRC signaling and subsequently transmits trigger 11 through a new field or an existing field of the DCI, the UE may consider not to transmit an HARQ-ACK corresponding to CC#10.

Hereinafter, a specific example in which the BS informs about a list of sets limited in transmission of HARQ-ACK/NACK through RRC signaling.

In a first example, the BS may generate a list of HARQ-ACK/NACK sets limited in transmission by the UE on the basis of a cell index or a cell group. Thus, it is considered to configure a transmission limitation HARQ-ACK/NACK set by cell unit.

In a second example, the BS may generate a plurality of HARQ-ACK/NACK set lists limited in transmission by the UE on the basis of a bit index regarding entire HARQ-ACKs arranged with respect to M number of downlink subframes associated with a cell index and a single uplink subframe (i.e., an HARQ-ACK/NACK feedback time point).

In a third example, the BS may generate an HARQ-ACK/NACK limited in transmission by the UE or a plurality of HARQ-ACK/NACK set lists to be transmitted by the UE on the basis of a parameter defined by a combination of a cell index/cell group and a subframe index/time-domain downlink assignment index (DAI). The information regarding the subframe index/time-domain DAI may be commonly configured for a plurality of cells or may be separately configured for each cell. For example, in cases where the time-domain DAI value is Y or less regarding specific cells, the UE may configure for the specific cells to transmit an HARQ-ACK. In detail, in cases where the UE is configured to transmit HARQ-ACK when the BS selects cells 1, 2, and 3 as HARQ-ACK/NACK transmission targets and a value of the time-domain DAI regarding each cell is 2 or less, the UE does not transmit HARQ-ACK regarding a PDSCH whose DAI value exceeds 2.

As described above, it may be interpreted that HARQ-ACK regarding a PDSCH of a PCell is not included in the HARQ-ACK/NACK set limited in transmission by the UE. More characteristically, in a TDD system, it may be limited such that HARQ-ACK regarding a PDSCH corresponding to a first downlink subframe among M number of downlink subframes in a PCell is not included in the HARQ-ACK/NACK set limited in transmission. If the HARQ-ACK is included, the UE may consider to transmit the corresponding HARQ-ACK. Or, it may be interpreted that a physical channel regarding release of downlink SPS is not included in the transmission-limited HARQ-ACK/NACK set. This is to effectively manage resource occupation due to an SPS operation.

So far, the method of selecting HARQ-ACK as a target of transmission limitation has been described, but conversely, the aforementioned contents may also be applied to a case of configuring HARQ-ACK as a transmission target as is. For example, in the first example, the BS may generates lists of a plurality of HARQ-ACK/NACK sets as transmission targets on the basis of a cell index and a cell group and delivers the same to the UE. Thereafter, the BS delivers a DCI including information indicating one of the lists to the UE. Then, the UE may consider to transmit the corresponding HARQ-ACK/NACK according to HARQ-ACK/NACK set information as transmission target indicated in the DCI. In this case, the U E may not transmit HARQ-ACK other than the HARQ-ACK/NACK set indicated in the DCI. Alternatively, the UE may deliver information indicating the HARQ-ACK/NACK set through RRC signaling. For example, the UE may simultaneously transmit an RRC signal including information indicating the HARQ-ACK/NACK set and the HARQ-ACK within the HARQ-ACK/NACK set in accordance with the indication information to the BS. The BS may then consider to estimate the HARQ-ACK/NACK configuration transmitted from the UE on the basis of the HARQ-ACK/NACK set indication information transmitted from the UE.

In a specific example, in a state in which the BS informs the UE in advance about a plurality of sets of cells in which HARQ-ACK may be transmitted by the UE (or cells which may be excluded in transmission of HARQ-ACK/NACK) through higher layer signaling (e.g., RRC signaling), the BS may indicate one of the plurality of sets of cells through L1 signaling (e.g., a DL grant DCI). Upon receiving the set, the UE may transmit HARQ-ACK/NACK feedback only for the one indicated set (or only for the other remaining sets excluding the corresponding set). Or, in the same situation, the UE may select one of the plurality of sets (simultaneously transmitting the selected one set information/index) and transmit HARQ-ACK/NACK feedback only for a cell of the selected set (or only for a cell within the remaining sets excluding the corresponding set). Meanwhile, in a TDD situation (e.g., a situation in which the Pcell operates in a TDD manner), the set of cells may be configured to include only a sub-set of a time-domain DAI by applying the third scheme.

In the TDD system, a configuration and a size of a set (hereinafter, referred to as a "bundling window") of downlink (DL) subframes corresponding to a single uplink (UL) subframe (the number of DL subframes corresponding to HARQ-ACK/NACK feedback transmitted through a single UL subframe) may be varied according to UL subframes. For example, in the case of a TDD UL-DL configuration 2, DL subframes corresponding to UL subframe#1 is two subframes, and a DL subframe corresponding to UL subframe#2 is one subframe. In this manner, a maximum HARQ-ACK/NACK payload size may be varied according to an index of a UL subframe in which the UE is to transmit a PUCCH. In configuring CA, in the case of a specific cell, a corresponding subframe position within the bundling window may not be a DL subframe (or when it is a special subframe and PDSCH scheduling is not performed). Also, in a situation in which cells having different TDD UL-DL configurations (e.g., between different TDD UL-DL configurations or between a TDD cell and an FDD cell) are configured by CA, HARQ-ACK/NACK feedback timing (position/size of bundling window corresponding thereto) corresponding to a specific DL subframe may be configured to be different by cells. A ratio of the number of cells configured by downlink and the number of cells configured by uplink may be different according to subframes. In this case, applying HARQ-ACK/NACK codebook information/candidate configuration (e.g., HARQ-ACK/NACK feedback target bit index/cell index/subframe index/DAI value combination, etc.) to every UL subframe equally may be ineffective in terms of HARQ-ACK/NACK payload reduction/adaptation.

Thus, for effective reduction/adaptation, HARQ-ACK/NACK payload, the present invention proposes that HARQ-ACK/NACK codebook information/candidate (e.g., HARQ-ACK/NACK feedback target cell (and/or DAI) set candidate) should be configured to be independent (different) by HARQ-ACK/NACK transmission UL subframes, based on which an HARQ-ACK/NACK codebook for configuring HARQ-ACK/NACK payload in each UL subframe should be dynamically indicated/selected. For example, for UL subframe #1, a cell set X and Y, and for UL subframe #2, a cell set Z and W may be set in advance as HARQ-ACK/NACK codebook information/candidate for configuring HARQ-ACK/NACK payload in each UL subframe through higher layer signaling (e.g., RRC signaling), and here, the cell set X/Y and the cell set Z/W may be configured as different cell combinations, some (e.g., X and Z) are the same and the other (e.g., Y and W) may be configured as different cell combinations, or all of them may be configured as the same (e.g., X and Z are the same and Y and W are the same) cell combination. On the basis of this, one of the cell set X and Y may be indicated as a HARQ-ACK/NACK feedback target by the BS or selected by the UE through a DL subframe corresponding to UL subframe #1, while one of the cell set Z and W may be indicated as a HARQ-ACK/NACK feedback target by the BS or selected by the UE through a DL subframe corresponding to UL subframe #2.

In another scheme, a value of the HARQ-ACK/NACK set list may have a ratio form or may designate the number of HARQ-ACK/NACK bits/the number of scheduling cells to be limited or to be limited in transmission may be designated on the basis of the ratio. For example, a first set of the HARQ-ACK/NACK may be designated to 100% and a second set thereof may be designated to 50%. Thereafter, on the assumption that a total number of HARQ-ACK/NACKs corresponding to UL#n1 is 64 bits and a total number of HARQ-ACK/NACKs corresponding to UL#n2 is 32 bits, when 50% is selected as information regarding HARQ-ACK/NACK codebook in each DL subframe, HARQ-ACK transmitted in UL subframe #n1 may be interpreted to transmit bit indices 0-31 and HARQ-ACK transmitted in UL subframe#n2 may be interpreted to transmit bit indices 0-15.

In another scheme, it may be considered that an HARQ-ACK/NACK set list is separately configured by UL subframes for transmitting a PUCCH or by bundling windows or is separately interpreted. For example, when a total number of HARQ-ACK/NACKs in UL subframe#n1 is 64 bits and a total number of HARQ-ACK/NACKs corresponding to UL subframe#n2 is 32 bits, HARQ-ACK/NACK bit indices 0-31 may be expressed for UL subframe#n1 and HARQ-ACK/NACK bit indices 0-15 for UL subframe#n2, regarding the same codebook information indicator value.

The above scheme is merely an example, and the contents described above may also be applied to a case in which a cell index is selected or a combination of a cell index and a time-domain index in selecting HARQ-ACK or a selected bit index pattern.

In applying the above schemes, in the case of TDD-FDD CAs (i.e., in cases where a PCell of CA is TDD and SCell is FDD) or in cases where different TDD UL-DL configurations (in cases where TDD UL-DL configurations of PCell and SCell are different in TDD CA) are used, an HARQ-ACK/NACK set list may be configured to a state in which a DL subframe index which does not exist or which is added according to a corresponding case. If HARQ-ACK/NACK selection is expressed as a combination of a cell index and a time-domain index and when a corresponding time-domain index is not a DL subframe or a subframe not available for PDSCH scheduling (e.g., in the case of three DwPts in a special subframe) in a specific cell, the corresponding index may be disregarded.

I-1. Scheme of Configuring DCI-Based Transmission-Limited HARQ-ACK/NACK

The BS may inform the UE about a final transmission-limited HARQ-ACK, on the transmission-limited HARQ-ACK/NACK set lists informed to the UE through RRC signaling, through a DCI. Information regarding the transmission-limited HARQ-ACK may be expressed through a new field of the DCI or through a portion of an existing field. The new field may be added only to the DCI on a user-specific search sauce (USS). Also, the DCI including the information regarding the transmission-limited HARQ-ACK may serve for DL resource scheduling (i.e., DL grant). The reason is because, without DL resource scheduling, the UE will not transmit HARQ-ACK, regardless of transmission-limited HARQ-ACK/NACK configuration, and thus, usefulness of corresponding information may be degraded.

Meanwhile, a plurality of cells (PCell and/or SCells) may perform DL resource scheduling in a CA situation, and here, in cases where transmission-limited HARQ-ACK/NACK information is included in each DCI, each value may be configured (1) to be the same or may be configured 2) to be independently.

In a specific example, when the DCI is transmitted in CC#x and CC#y, in the case of (1), when the DCI of CC#x indicates Trigger10, the DCI of CC#y may also indicate Trigger10, and in the case of (2), although the DCI of CC#x indicates Trigger10, the DCI of CC#y may indicate another trigger index.

Advantages when the transmission-limited HARQ-ACK/NACK information included in each DCI are configured to be the same may be that, although the UE fails to detect some DCI, if the UE detects at least one DCI, it may obtain information regarding HARQ-ACK as a target of transmission limitation. In addition, when the UE does not detect none of the DCIs, the UE will not transmit any HARQ-ACK, and thus, ambiguity between the UE and the BS may be prevented.

In cases where the transmission-limited HARQ-ACK/NACK information of each DCI is independently configured, it may be assumed that the UE configures a union regarding the HARQ-ACK/NACK sets within RRC signaling to correspond to information regarding the transmission-limited HARQ-ACK included in each DCI and does not transmit any of HARQ-ACKs. For example, in cases where {CC#3, CC#4} is configured as a transmission limitation target in the DCI of CC#1 and {CC#6, CC#10} is configured as a transmission limitation target in the DCI of CC#2, a finally transmission-limited HARQ-ACK may be configured to correspond to {CC#3, CC#4, CC#6, CC#10}. In this case, in finally configuring the transmission-limited HARQ-ACK, corresponding HARQ-ACK combinations may be advantageously configured to be various. However, if some DCI are lost so the UE fails to receive the same, ambiguity may occur between the UE and the BS.

In cases where an introduction of a new field to express information regarding transmission-limited HARQ-ACK in a DCI is not considered, an introduction of an additional DCI format may be considered. In addition, in this case, the corresponding DCI format may be considered to include transmission-limited HARQ-ACK/NACK information. Also, the corresponding DCI may be CRC-masked with a new RNTI (e.g., AN_RNTI). The BS may inform the UE about a timing (expressed by a combination of a period and an offset) at which a corresponding new DCI format is transmitted, and may consider that an HARQ-ACK/NACK set as a target of transmission limitation is changed on the basis of the corresponding period. Also, in this case, a situation in which the UE cannot detect the corresponding DCI may be considered, and here, it is considered to assume a transmission-limited HARQ-ACK/NACK set according to a default setting configured in advance or by RRC signaling. The default setting may correspond to any one of transmission-limited HARQ-ACK/NACK set list configured by RRC signaling.

Ambiguity may occur between the BS and the UE regarding whether the UE uses default setting or whether the UE uses a transmission-limited HARQ-ACK/NACK set indicated by the DCI, and in order to prevent this, it may be considered to include information regarding whether the UE uses default setting in a UCI (HARQ-ACK) and transmit the same. The information will be referred to as an "AN type indicator (ATI) hereinafter. The information may be expressed by 1 bit, and it may be considered that the BS receives the corresponding value and estimates transmission-limited HARQ-ACK/NACK information and information regarding HARQ-ACK/NACK configuration. Since a HARQ-ACK/NACK payload size at a transmission timing may be varied according to the ATI value, it is required to secure detection performance regarding the ATI value.

I-1-1. ATI Transmission Scheme

Hereinafter, a specific example of a scheme of transmitting an ATI according to the present disclosure will be described. The ATI according to the present disclosure may be multiplexed with a finally selected HARQ-ACK/NACK bit sequence. In detail, it may be considered that the ATI is mapped to a bit index ahead of a HARQ-ACK/NACK bit sequence and, thereafter, the ATI and HARQ-ACK are joint-encoded and transmitted through a PUCCH resource. The BS may estimate an ATI value and perform HARQ-ACK/NACK detection through blind decoding. For example, in cases where a HARQ-ACK/NACK payload size in default setting is 11 bits and a HARQ-ACK/NACK payload size indicated by a detection-failed DCI is 15 bits, the BS may estimate an appropriate HARQ-ACK/NACK payload size by performing decoding on 12 bits (=11+1) and 16 bits (=15+1) and subsequently determining whether the ATI value regarding default setting is 1 or whether the ATI value regarding an indication in a DCI is 0.

In order to further increase the estimation performance, it may be considered to increase the number of bits regarding the ATI value. In detail, in the case of a normal CP, it may be considered to modulate the ATI value in a modulation manner similar to that of modulation of a reference signal (RS), and in this case, it may be assumed that the ATI value-modulated symbol is multiplied with a symbol of a second reference signal (RS) of each slot. Here, the BS may first estimate an ATI value from the reference signal RS, and after estimating a size and a configuration of the HARQ-ACK/NACK payload on the basis of the corresponding ATI value, the BS may perform decoding to detect HARQ-ACK/NACK regarding the corresponding setting. The ATI may also be transmitted through CRC masking/scrambling regarding a UCI (e.g., HARQ-ACK) in a different manner.

I-2. Scheme of Limiting Transmission of HARQ-ACK on the Basis of UE Selection

In another scheme, the UE may consider a scheme of limiting HARQ-ACK/NACK transmission by selecting one of HARQ-ACK/NACK set lists indicated through RRC signaling received from the BS. The UE may designate a state of ACK/NACK/DTX, and the like, regarding the entire HARQ-ACK on the basis of the received list. Regarding some sets in the HARQ-ACK/NACK set list received through RRC signaling, there may be a case in which an HARQ-ACK/NACK state is similar, or the HARQ-ACK/NACK payload may be required to be flexibly changed according to a current power consumption situation of the UE.

In order to solve the aforementioned situation, or the like, the UE may consider to select a transmission-limited HARQ-ACK/NACK set indicated through the RRC signaling received from the BS, and in order to solve an ambiguity problem regarding the transmission-limited HARQ-ACK/NACK information between the UE and the BS, the UE may consider to include the aforementioned ATI to transmit the same together when transmitting the UCI (HARQ-ACK). Meanwhile, in order to more flexibly select a list of the HARQ-ACK/NACK set configured through RRC signaling, the ATI may be considered to be expressed by 2 bits or greater. This scheme may be used even when the BS provides HARQ-ACK/NACK codebook information to the UE through a DCI HARQ-ACK/NACK codebook information to the UE through the DCI, and in this case, the ATI may be utilized as a checking procedure for removing ambiguity between the BS and the UE.

I-3. UE Operation when (E)PDCCH/PDSCH Corresponding to Transmission-Limited HARQ-ACK is Received In cases where the BS selects a transmission-limited HARQ-ACK/NACK set, the corresponding BS may not perform scheduling in a DL subframe and a serving cell corresponding to the configured HARQ-ACK. Or, an operation when the UE receives an (E)PDCCH/PDSCH, or the like, corresponding to the transmission-limited HARQ-ACK, such as a PDSCH transmission anticipated to require data combining several times during decoding or selecting the transmission-limited HARQ-ACK/NACK by the UE, and the like, is required to be designated. As the UE operation, (1) a case in which the UE successfully decodes a PDSCH (or DL SPS release) not transmitting HARQ-ACK and (2) a case in which the UE fails to decode the PDSCH may be considered.

I-3-1. Case in which Decoding of PDSCH or DL SPS Release Regarding Transmission-Limited HARQ-ACK is Successful The BS may retransmit a physical channel corresponding to the HARQ-ACK and the UE may not perform decoding on the re-transmitted physical channel. The re-transmitted physical channel may be, for example, a PDSCH. Here, the UE may recognize the retransmission when an HARQ process ID is the same and a new data indicator (NDI) value has been toggled, compared with a previously received DCI, within a DCI scheduling the corresponding PDSCH. Here, the UE may flush a buffer in which the corresponding PDSCH is stored at a timing at which previous decoding was successful. In the case of DL SPS release, when the previous decoding is successful, the UE may not perform decoding. When corresponding HARQ-ACK/NACK transmission is allowed at the corresponding re-transmission timing, the UE may consider to report ACK regarding the re-transmission.

In another scheme, the UE may perform decoding again on retransmission, and here, even in cases where decoding fails at the corresponding timing, the UE configures a corresponding HARQ-ACK/NACK state to ACK.

I-3-2. Case in which Decoding of PDSCH Regarding Transmission-Limited HARQ-ACK or DL SPS Release Fails The BS may re-transmit a physical channel corresponding to HARQ-ACK, and the UE may perform decoding by physical channels previously received and stored in a buffer in decoding the re-transmitted physical channel.

II. Scheme of Performing Additional Bundling on Partial UCI (HARQ-ACK)

In order to reduce a HARQ-ACK/NACK payload size, the UE may additionally perform bundling on the entirety or a portion of HARQ-ACKs. Here, the BS may consider to configure an HARQ-ACK/NACK set to perform bundling and a candidate of a bundling method to the UE through RRC signalling. In detail, the BS (1) may configure a plurality of lists regarding a cell index or a cell group (CG) to perform spatial bundling to the UE, (2) may designate a plurality of HARQ-ACK/NACK sets to be bundled to 1 bit through ANDing operation to the UE, or (3) may designate a plurality of cell indices or cell groups CG to apply a scheme of indicating the number of continuous ACKs according to a DAI value to the UE and again configure a list of a plurality of HARQ-ACK/NACK sets to the UE. Thereafter, the BS may consider to inform the UE about HARQ-ACK/NACK bundling information to be utilized in actual transmission among the lists through L1 signaling (e.g., DCI). In a specific embodiment, when the BS configures trigger00[CC#1, CC#2], trigger01[CC#2, CC#5], trigger10 [CC#5], trigger11[CC#4, CC#8] to the UE through RRC signaling and indicates trigger01 to the UE through DCI in the (1) (or (3)) scheme, the UE may consider to perform spatial bundling (or ACK counter-based compression) on HARQ-ACK corresponding to CC#2 and CC#5.

A specific example of a scheme of configuring HARQ-ACK/NACK bundling information through RRC in the scheme of (2) will be described.

In a first example, a plurality of HARQ-ACK/NACK bundle sets are configured in each list. Here, the UE performs a process of reducing each of the HARQ-ACK/NACK bundle sets to 1 bit through am ANDing operation. For example, when HARQ-ACK is expressed by a cell index, when trigger00 [(CC#2, CC#4), (CC#3), (CC#7, CC#8, CC#15)], trigger01 [(CC#1, CC#2, CC#3), (CC#4)] are informed to the UE through RRC signaling, the UE performs bundling on trigger00 regarding HARQ-ACK corresponding to cell indices 2 and 4 by 1 bit, HARQ-ACK corresponding to a cell index 3 by 1 bit, and HARQ-ACK corresponding to cell indices 7, 8, and 15 by 1 bit.

In a second example, the BS may designate one HARQ-ACK/NACK bundle set in each list. Here, the UE may perform a process of reducing the entire HARQ-ACKs included in each list to 1 bit through ANDing operation. For example, in expressing HARQ-ACK by a cell index, when the BS indicates List0 [7, 8, 15], List1 [1, 2, 3] to the UE through RRC signaling, the UE performs bundling to reduce HARQ-ACK corresponding to cell indices 7, 8, and 15 to 1 bit, regarding List0.

In the above, the example of each scheme has been described in the case of expressing in the form of cell index, but the present invention may also be applied to a case in which a bit index is given to the entire HARQ-ACK and bundling is performed in the form expressed by a bit index or to a case in which bundling is performed by cell groups in a mixed manner. It may be interpreted that HARQ-ACK regarding a PDSCH of PCell is not included in the bundling target HARQ-ACK/NACK set. In detail, in the TDD system, it may be interpreted that HARQ-ACK regarding a PDSCH corresponding to a first DL subframe among M number of DL subframes is not included in the PCell. Or, it may be interpreted such that a physical channel regarding DL SPS release is not included in the bundling target HARQ-ACK/NACK set. This is to effectively manage resource occupation due to an SPS operation.

So far, selection of HARQ-ACK/NACK as a target of bundling or a cell index has been described in describing a scheme of selecting HARQ-ACK/NACK bundling information, but the aforementioned contents may also be applied as is to a case of configuring HARQ-ACK not performing bundling. However, even in the case of HARQ-ACK not performing bundling, spatial bundling may be performed. For example, as in the first example, the BS may configure a list of a plurality of HARQ-ACK/NACK sets as a target of transmission on the basis of a cell index or a cell group reference, transfer the list to the UE through RRC signaling, and subsequently transfer information indicating one of list transferred through the RRC signaling to the UE through a DCI. Upon receiving the corresponding DCI, the UE may perform bundling on HARQ-ACK excluding the corresponding HARQ-ACK according to HARQ-ACK/NACK set information indicated in the DCI. As a method for performing bundling, the UE may consider to perform ANDing operation on every HARQ-ACK not indicated in the DCI or may consider to perform ANDing operation by unit (e.g., a cell group or a lower group of cells) configured in advance or in a higher layer. Here, the UE may not apply bundling to the indicated HARQ-ACK/NACK set or may perform only spatial bundling. Or, in a case where the UE simultaneously transmits information indicating the HARQ-ACK/NACK set with HARQ-ACK, the UE may perform bundling on HARQ-ACK excluding the HARQ-ACK/NACK indicated in the DCI. Here, the BS may consider to estimate an HARQ-ACK/NACK bundling operation of the UE on the basis of the HARQ-ACK/NACK set indication information transmitted from the UE.

In a specific example, in a state in which the BS configures a plurality of sets of cells which may be a spatial bundling or time bundling application target regarding HARQ-ACK (or which may be excluded from the spatial bundling or time bundling application target) to the UE through higher layer signaling (e.g., RRC signaling), the BS may indicate one of the plurality of corresponding sets through L1 signaling (e.g., a DCI including DL grant). Upon receiving the same, the UE may generate/transmit HARQ-ACK/NACK feedback in which spatial bundling or time bundling is applied only to the indicated set of cell (or only the remaining cells excluding the corresponding set). Or, in the same situation, the UE may select one of the plurality of corresponding sets, transmit information/index regarding the selected set, and generate/transmit HARQ-ACK/NACK feedback in which spatial bundling or time bundling is applied only to cells of the selected set (or the other remaining cells excluding the cells of the corresponding set).

The spatial bundling may refer to a scheme of generating single HARQ-ACK by performing ANDing operation between HARQ-ACK/NACKs corresponding to the plurality of transmission blocks (TBs) in a state in which the UE has received the plurality of TBs are received on the single DL subframe. Also, the time bundling may refer to (1) a scheme of generating a single HARQ-ACK by performing ANDing operation on HARQ-ACKs corresponding to a plurality of TBs in a state in which the UE has received the plurality of TBs on a plurality of subframes or (2) a scheme of generating HARQ-ACK/NACK feedback having an N-bit length (e.g., N=2) using HARQ-ACK/NACK state mapping configured in a continuous ACK form corresponding to continuous DAI value (e.g., mapping according to Table 3 to Table 6, here, HARQ-ACK(k) indicates HARQ-ACK/NACK response regarding a PDSCH corresponding to DAI=k+1. Here, M refers to the number of DL subframes corresponding to one UL subframe (HARQ-ACK regarding the M number of DL subframes is transmitted through the same single UL subframe), and a DAI (signaled through DL grant) may refer to an order value indicating the order in which a PDSCH is scheduled within an interval of the corresponding M number of subframes.

Table 3 below shows a continuous ACK counter when M=3.

TABLE 3

| HARQ-ACK(0), HARQ-ACK(1), HARQ-ACK(2) | Bundled bit |
|---|---|
| ACK, ACK, ACK | 1, 1 |
| ACK, ACK, NACK/DTX | 1, 0 |
| ACK, NACK/DTX, any | 0, 1 |
| NACK/DTX, any, any | 0, 0 |

Table 4 below indicates a continuous ACK counter when M=4.

TABLE 4

| HARQ-ACK(0), HARQ-ACK(1), HARQ-ACK(2), HARQ-ACK(3) | Bundled bit |
|---|---|
| ACK, ACK, ACK, NACK/DTX | 1, 1 |
| ACK, ACK, NACK/DTX, any | 1, 0 |
| ACK, DTX, DTX, DTX | 0, 1 |
| ACK, ACK, ACK, ACK | 0, 1 |
| NACK/DTX, any, any, any | 0, 0 |

TABLE 4-continued

| HARQ-ACK(0), HARQ-ACK(1), HARQ-ACK(2), HARQ-ACK(3) | Bundled bit |
|---|---|
| (ACK, NACK/DTX, any, any), except for (ACK, DTX, DTX, DTX) | 0, 0 |

Table 5 below indicates a continuous ACK counter when M=5.

TABLE 5

| HARQ-ACK(0), HARQ-ACK(1), HARQ-ACK(2), HARQ-ACK(3), HARQ-ACK(4) | Bundled bit |
|---|---|
| ACK, ACK, ACK, NACK/DTX, any | 1, 1 |
| ACK, ACK, DTX, DTX, DTX | 1, 0 |
| ACK, ACK, ACK, ACK, ACK | 1, 0 |
| ACK, DTX, DTX, DTX, DTX | 0, 1 |
| ACK, ACK, ACK, ACK, NACK/DTX | 0, 1 |
| NACK/DTX, any, any, any, any | 0, 0 |
| (ACK, NACK/DTX, any, any, any), except for (ACK, DTX, DTX, DTX, DTX) and (ACK, ACK, DTX, DTX, DTX) | 0, 0 |

Table 6 below indicates a continuous ACK counter when M=6.

TABLE 6

| HARQ-ACK(0), HARQ-ACK(1), HARQ-ACK(2), HARQ-ACK(3), HARQ-ACK(4) | Bundled bit |
|---|---|
| ACK, ACK, ACK, DTX, DTX, DTX | 1, 1 |
| ACK, ACK, ACK, ACK, ACK, ACK | 1, 1 |
| ACK, ACK, DTX, DTX, DTX, DTX | 1, 0 |
| ACK, ACK, ACK, ACK, ACK, NACK/DTX | 1, 0 |
| ACK, DTX, DTX, DTX, DTX, DTX | 0, 1 |
| ACK, ACK, ACK, ACK, NACK/DTX, any | 0, 1 |
| NACK/DTX, any, any, any, any, any | 0, 0 |
| (ACK, NACK/DTX, any, any, any, any), except for (ACK, DTX, DTX, DTX, DTX, DTX) and (ACK, ACK, DTX, DTX, DTX, DTX) and (ACK, ACK, ACK, DTX, DTX, DTX) | 0, 0 |

In another method, the BS may indicate whether to apply the foregoing HARQ-ACK/NACK bundling to the entire cells or a previously designated portion of cell sets through L1 signaling (e.g., DCI including DL grant).

II-1. Scheme of Configuring DCI-Based HARQ-ACK/NACK Bundling

The BS may provide final HARQ-ACK/NACK bundling information in the list of HARQ-ACK/NACK sets to the UE through RRC signaling. The information regarding the HARQ-ACK/NACK bundling may be expressed through a new field in a DCI or may be expressed by re-using a portion of an existing field. An introduction of the new field may be limited to a DCI regarding a USS. Also, the DCI including the information regarding the HARQ-ACK/NACK bundling may correspond to DL grant. The reason is because the corresponding configuration scheme is anticipated to be useful in the case of actually transmitting HARQ-ACK. An introduction of UL grant may degrade throughput regarding UL grant, and without DL scheduling, the UE will not transmit HARQ-ACK, regardless of HARQ-ACK/NACK bundling configuration, and thus, usefulness of the corresponding information may be degraded.

Meanwhile, when the DCI is transmitted for DL scheduling in a plurality of cells (PCell and/or SCells) in a CA situation, if HARQ-ACK/NACK bundling information is included in each DCI, each value may be (1) configured to be the same or (2) configured to be independently.

In cases where the BS independently configures the HARQ-ACK/NACK bundling information in each DCI, the UE may configure information regarding the HARQ-ACK/NACK bundling included in each DCI for a union regarding an HARQ-ACK/NACK set indicated by RRC signaling, and configure all the HARQ-ACKs to 1 bit through an ANDing operation. Or, the UE may generate 1 bit by perform an ANDing operation on each RRC list.

In cases where a new field is not introduced to express information regarding the HARQ-ACK/NACK bundling in the DCI, an introduction of an additional DCI format may be considered. In addition, in this case, the corresponding DCI format may be considered to include HARQ-ACK/NACK bundling information regarding a plurality of UEs. Also, the corresponding DCI may be considered to be CRC-masked with a new RNTI (e.g., AN_RNTI). The BS may inform the UE about a timing (expressed by a combination of a period and an offset) at which a corresponding new DCI format is transmitted, and may consider that an HARQ-ACK/NACK set as a target of transmission limitation is changed on the basis of the corresponding period. In this case, an ambiguity problem may arise between the UE and the BS as mentioned above, and in order to prevent the problem, the BS may newly configure default setting regarding HARQ-ACK/NACK bundling through RRC signaling or may determine a partial list as default setting. Here, whether the UE uses the corresponding default setting may be informed through the ATI proposed above.

II-2. Scheme of Configuring UE Selection-Based HARQ-ACK/NACK Bundling

Similarly to the proposal described in the above paragraph, the UE may select an HARQ-ACK/NACK bundling target and technique. Similarly, the UE may transmit a received ATI indicating one of lists regarding the HARQ-ACK/NACK bundling indicated through RRC signaling together with UCI (HARQ-ACK).

Or, for the reason of introduction of a CRC with respect to HARQ-ACK in a next-generation system, the UE may configure HARQ-ACK with respect to scheduling cell/subframe and transmit a UCI including the HARQ-ACK through a PUCCH. Also, a maximum payload size supported by the PUCCH may be configured to be smaller than a maximum number of bits regarding HARQ-ACK/NACK feedback. In this case, the UE may determine whether to perform bundling on the basis of scheduling cell/subframe or the received (E)PDCCH or PDSCH. For example, it is assumed that a maximum payload size supportable by the PUCCH is X and a maximum number of bits regarding HARQ-ACK is Y' (>X). Also, it is assumed that the number of HARQ-ACK/NACK bits calculated on the basis of scheduling at a specific timing is Y. Here, the UE may compare the size of Y' and X, and when Y' is greater, the UE may perform bundling, and when the size of Y' is smaller than X, the UE may not perform bundling. Here, Y' may be an HARQ-ACK/NACK payload size indicated by the BS.

III. Scheme of Limiting Scheduling Corresponding to Partial UCI (HARQ-ACK)

In order to limit a maximum size of a UCI (e.g., HARQ-ACK) at a timing at which the UCI is transmitted, scheduling limitation regarding some CCs and/or DL subframes may be considered. For example, CCs and/or DL subframes not to be scheduled may be configured by a combination of a cell index, a cell group, a UCI (e.g., HARQ-ACK) bit index, an index regarding a DL subframe associated with a UL subframe in which a UCI is transmitted, and the like. Here, the UE may not perform detection attempt on the assumption that a DCI is not transmitted in the corresponding area. In another scheme, regarding M number of DL subframes associated with one UL subframe in which a UCI is transmitted, the BS may designate a maximum number of subframes to be scheduled (or the number of PDCCHs/EPDCCHs or the number of PDSCHs) or a maximum DAI value (defined by "N") which may be equivalently included in DL grant, and the like, to the UE through higher layer signaling (e.g., RRC signaling) (here, N may be the same as M or may be smaller than M). In a TDD situation, in a DCI including DL grant transmitted by each cell may include a DAI value (which will be referred to as a "t-DAI" and it is assumed that it starts from 1), a counter value indicating in which order DL data corresponding to the DCI has been scheduled in a time axis, i.e., a time domain (i.e., a subframe), within a bundling window of the corresponding cell. Also, in the DCI including DL grant transmitted by each cell, a DAI including a counter value indicating in which of the entire cells the DL grant included in the corresponding DCI (which will be referred to as a "c-DAI" and it is assumed that it starts from 1) is placed (on a certain or specific reference (e.g., a cell index order) in the same DL subframe) may be included.

In a specific example, it is assumed that the number of DL subframes corresponding to a UCI (e.g., HARQ-ACK) transmitted by the UE to any one cell in a UL subframe is M. Also, the DL subframes are assumed to be {0}, {1}, . . . , {M−1}. The BS may previously designate a DL subframe set to be limited in scheduling through RRC signalling or a plurality of N values indicating a maximum number of a DL subframes (or a maximum DAI value as possible) which can be scheduled regarding M number of DL subframes. Here, the designation may be performed (1) by UEs, (2) by serving cells, or (3) by UL subframes of a serving cell. In this state, the BS may inform the UE about the DL subframe set as an actual target of scheduling limitation in the plurality of DL subframe sets informed through the RRC signalling, through L1/L2 signaling (e.g., DCI including DL grant). Or, the BS may inform the UE about anyone N value to be actually applied among a plurality of N values indicating the maximum number of DL subframes which can be scheduled, informed through the RRC signalling, through L1/L2 signaling (e.g., DCI including DL grant).

In the TDD system, M value may be different in each UL subframe even in the same cells, and in the case of CA between TDD cells or in the case of CA between a TDD cell and an FDD cell, M value may be different in each cell even in the same UL subframe. Thus, configuring scheduling limitation information in each UL subframe may be ineffective in terms of overhead. Thus, as mentioned above, it may be advantageous to share information regarding a DL subframe (set) as a scheduling limitation target in at least the same cell or regarding the UE. In this case, a reference M value when the scheduling limitation is configured may be a maximum M value within a cell according to a unit or may be a maximum M value in the entire cells. Here, the M value regarding one UL subframe may be smaller than a maximum M value as a reference when the scheduling limitation is configured, and here, information regarding a DL subframe exceeding the M value regarding the UL subframe may be disregarded. For example, in cases where an M value in one UL subframe is 3 and a maximum M value as a reference when scheduling limitation is configured is configured to 4, and scheduling on DL subframes corresponding to 0, 1, and 3 is limited, the UE may limit scheduling only on 0 and 1 among DL subframes corresponding to the UL subframe. When the scheduling limitation information is in the form of the maximum number of scheduling-available DL subframes as described above, if the N value is greater than M in a corresponding serving cell, scheduling may be performed on the basis of the M value, instead of N value, and generate and transmit HARQ-ACK/NACK information.

For example, regarding an UL subframe in which the UE transmits a UCI (e.g., HARQ-ACK), when M value for a cell (group) 1 is M1 and M value for cell (group) 2 is M2, the BS may set a DL subframe set as a target of scheduling limitation or an N value, a maximum number of scheduling-available DL subframes with respect to Max (M1, M2) through RRC signalling. In a specific example, it is assumed that one DL subframe set is set to L number and each index is expressed as i_{0}, i_{1}, . . . , i_{L−1}. Here, a DCI transmitted by the BS to the corresponding UE may include a field indicating one of a DL subframe set configured in the RRC or a set regarding the N value as the maximum number of scheduling available DL subframes, and the corresponding indication value may be configured to be the same by cells or for every DCI.

On the assumption that scheduling is not performed in DL subframe in cell (group) 1 and cell (group) 2 when a finally configured scheduling limited DL subframe is i_{0}, i_{1}, . . . , i_{L−1}, the UE may not perform PDCCH/EPDCCH detection attempt. Also, the UE may not generate and transmit a UCI regarding the corresponding DL subframe. In cases where the UE fails to receive information regarding the scheduling-limited DL subframe, the UE may attempt to detect PDCCH/EPDCCH corresponding to every DL subframe (perform in a corresponding DL subframe in case of not cross-carrier scheduling, and perform in configured scheduling cell in the case of cross-carrier scheduling), or may attempt to detect only a PDCCH/EPDCCH corresponding to a DL subframe designated by default setting through RRC signalling.

In another example, in cases where the finally configured scheduling limitation information is configured as the N value, the maximum number of scheduling-available DL subframes (or a maximum DAI value) as described above, the UE may generate and transmit a UCI on the basis of a minimum value of the corresponding M and N to each serving cell. Also, it may be assumed that the UE does not transmit at least UCI regarding scheduling information exceeding N regarding N<M, and in addition, it may be assumed that PDCCH/EPDCCH detection and/or corresponding PDSCH reception/decoding are not performed.

A method for limiting scheduling also in a cell (or a specific carrier in CA) in a similar manner may be considered, and the method may utilize a Cell (CC)-domain DAI (hereinafter, referred t as "c-DAI"). For example, although the number of serving cells configured (or activated) for the UE is N, the BS may set a maximum c-DAI value to be equal to or smaller than N through RRC signaling. Here, it may be assumed that the number of cells simultaneously scheduled by the BS and the UE does not exceed the corresponding maximum c-DAI value. Also, on the basis of the c-DAI value, the UE may consider to generate HARQ-ACK only for a cell in which the c-DAI value corresponds values from 1 to the maximum c-DAI value and transmit the same to the BS. In addition, in performing (E)PDCCH monitoring, the UE may reduce power of the UE and the number of blind decoding by limiting to a cell in which a c-DAI value corresponds to values from 1 to the maximum c-DAI value.

In the TDD situation, the c-DAI value may be first allocated to a cell scheduled first in a time axis, and in this case, it may be independent from cell index order (characteristically, PCell may be excluded and, in the PCell, the c-DAI value may be always 1). That is, for example, in a state in which the number of DL subframes interworking with a single UL subframe is M, when scheduling is at second and fourth in cell index i and scheduling is at first and third in cell index i+1, a c-DAI value of cell index i+1 may be ahead of a c-DAI value of cell index i. IN this situation, when the UE misses (E)PDCCH of a cell in which the c-DAI value precedes, the UE may still perform (E)PDCCH monitoring regarding the entire (activated) serving cells in order to search for a serving cell corresponding to every c-DAI from 1 to a maximum c-DAI value.

As a solution, the BS may consider to designate/signal c-DAI in cell index order. For example, the UE and the BS may assume that c-DAI value of cell index i is always smaller than c-DAI value of cell index i+1. The scheme may be a scheme of designating scheduling order or a case of designating a c-DAI value in advance according to cell index order because the BS already knows scheduling information of at least M DL subframe. Here, in cases where the UE obtains a preset maximum c-DAI value, the UE may not perform (E)PDCCH monitoring on the other remaining cells greater than a cell index of the corresponding cell.

IV. Configuration Scheme Regarding PUCCH Format and Bundling Combination

In a next-generation system, the use of a plurality of PUCCH formats according to a UCI (e.g., HARQ-ACK/NACK or HARQ-ACK and CSI, etc.) size may be introduced, and selection of the PUCCH format may operate in conjunction with a UCI size reduction (e.g., HARQ-ACK/NACK bundling). Simply, after the PUCCH format is first selected, whether to reduce a UCI size (e.g., HARQ-ACK/NACK bundling) may be determined according to an input size supported by the corresponding format. In another scheme, the BS may simultaneously configure a combination of a PUCCH format and the bundling scheme. Here, the BS may configure the combination to the UE through higher layer signaling or may designate a candidate set through higher layer signaling and designate a final combination to the UE using a DCI (e.g., AN resource indicator (ARI).

Meanwhile, the BS may determine the combination of the PUCCH format and bundling according to the number of UCI (HARQ-ACK) bits. The number of HARQ-ACK/NACK bits may indicate (1) after bundling is performed or (2) a case in which bundling is not performed. In the former case, radio resource may be advantageously effectively used in terms of network by increasing frequency of a PUCCH format with high multiplexing capacity as possible, but DL throughput loss may occur due to bundling. In the latter case, DL throughput loss may be minimized by minimizing bundling, but the use of resource for PUCCH transmission may be excessive generally due to high frequency of use of a new PUCCH format with a low multiplexing capacity. Whether to change a format according to an HARQ-ACK/NACK size or whether to perform bundling without changing the format may be configured to the UE through higher layer signaling on the basis of the tradeoff relationship. For example, between a PUCCH format 3 and a new PUCCH format, whether to change to a new format or whether to perform bundling may be configured to the UE through higher layer signaling when at least the number of HARQ-ACK/NACK bits not perform bundling exceeds 22. When a plurality of PUCCH formats are used differently according to the HARQ-ACK/NACK size, configuring information regarding format change or performing bundling in each section of each HARQ-ACK/NACK bit number may be considered or commonly configuring in the entire section may also be considered.

The embodiments of the present invention described above may be implemented by various means. For example, the embodiments of the present invention may be implemented by hardware, firmware, software, or any combinations thereof. Details thereof will be described with reference to the accompanying drawings.

Figure 11:
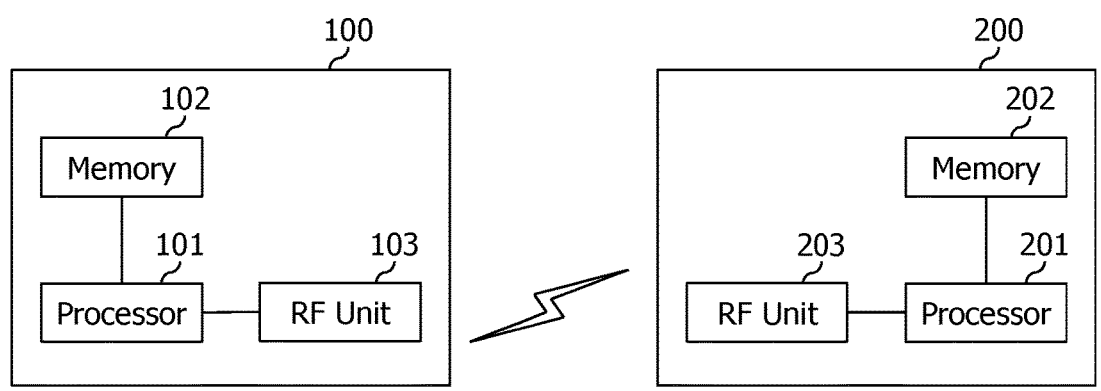
FIG. 11 is a block diagram illustrating a wireless communication system implementing the present disclosure.

FIG. 11 is a block diagram illustrating a wireless communication system implementing the present disclosure.

A base station (BS) 200 includes a processor 201, a memory 202, and a radio frequency (RF) unit 203. The memory 202 is connected to the processor 201 and stores various types of information for driving the processor 201. The RF unit 203 is connected to the processor 201 and transmits and/or receives a wireless signal. The processor 201 implements the proposed function, process, and/or scheme. In the aforementioned embodiment, an operation of the BS may be implemented by the processor 201.

An MTC device 100 a processor 101, a memory 102, and an RF unit 103. The memory 102 is connected to the processor 101 and stores various types of information for driving the processor 101. The RF unit 103 is connected to the processor 101 and transmits and/or receives a wireless signal. The processor 101 implements the proposed function, process, and/or scheme.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting a hybrid automatic repeat request (HARQ) acknowledgement (ACK)/negative-acknowledgement (NACK) for downlink data, the method performed by a user equipment (UE) which uses a plurality of cells based on carrier aggregation (CA) and the method comprising:

receiving, from a base station (BS), information on a list of candidate sets through higher layer signaling, wherein the list of candidate sets includes candidate HARQ-ACK/NACKs, transmission of which is to be dropped;

receiving, from the BS, information on a set selected from among the list of candidate sets;

receiving, from the BS, the downlink data through the plurality of cells;

determining a HARQ-ACK/NACK to be dropped based on the information on the set; and generating and transmitting uplink control information (UCI) including the HARQ-ACK/NACK for the downlink data, excluding the HARQ-ACK/NACK which is dropped based on the set.

2. The method of claim 1, wherein the information on the set is received through downlink control information (DCI).

3. The method of claim 2, wherein the DCI is received from each of the plurality of cells of the BS.

4. The method of claim 3, wherein the information on the set from each of the plurality of cells is same or different.

5. The method of claim 1, wherein the list of candidate sets is related to sets of cells to which transmission of the HARQ-ACK/NACK is to be dropped.

6. The method of claim 1, wherein when receiving of the information on the set fails, the set is determined based on a preset default setting.

7. The method of claim 6, further comprising:
transmitting information related to use of the preset default setting to the BS.

8. A user equipment (UE) for transmitting a hybrid automatic repeat request (HARQ) acknowledgement (ACK)/negative-acknowledgement (NACK) for downlink data, when a plurality of cells are used based on carrier aggregation (CA), the UE comprising:
a transceiver; and
a processor controlling the transceiver,
wherein the processor is configured to:
receive, from a base station (BS), information on a list of candidate sets through higher layer signaling, wherein the list of candidate sets includes candidate HARQ-ACK/NACKs, transmission of which is to be dropped;
receive, from the BS, information on a set selected from among the list of candidate sets;
receive, from the BS, the downlink data through the plurality of cells;
determine a HARQ-ACK/NACK to be dropped based on the information on the set; and
generate and transmit uplink control information (UCI) including HARQ-ACK/NACK for the downlink data, excluding the HARQ-ACK/NACK which is dropped based on the set.

9. The UE of claim 8, wherein the information on the set is received through downlink control information (DCI), and the DCI is received from each of the plurality of cells of the BS.

10. The UE of claim 9, wherein the information on the set from each of the plurality of cells is same or different.

11. The UE of claim 8, wherein the list of candidate sets is related to sets of cells to which transmission of the HARQ-ACK/NACK is to be dropped.

12. The UE of claim 8, wherein when receiving of the information on the set fails, the processor is further configured to determine the set based on a preset default setting.

13. The UE of claim 12, wherein the processor is further configured to control the transceiver to transmit information related to use of the preset default setting to the BS.

* * * * *